United States Patent
Cozzo et al.

(10) Patent No.: US 12,495,413 B2
(45) Date of Patent: Dec. 9, 2025

(54) METHOD AND APPARATUS FOR TRANSMISSION OF UPLINK CHANNELS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 17/647,584

(22) Filed: Jan. 10, 2022

(65) Prior Publication Data

US 2022/0225365 A1 Jul. 14, 2022

Related U.S. Application Data

(60) Provisional application No. 63/255,919, filed on Oct. 14, 2021, provisional application No. 63/250,021, (Continued)

(51) Int. Cl.
*H04W 72/1268* (2023.01)
*H04L 1/18* (2023.01)
(Continued)

(52) U.S. Cl.
CPC ........... *H04W 72/1268* (2013.01); *H04L 1/18* (2013.01); *H04W 72/23* (2023.01); *H04W 72/0446* (2013.01)

(58) Field of Classification Search
CPC ............. H04W 72/1268; H04W 72/23; H04W 72/0446; H04W 72/21; H04W 72/232;
(Continued)

(56) References Cited

U.S. PATENT DOCUMENTS

2021/0022158 A1* 1/2021 Wei ...................... H04L 1/0025
2022/0123865 A1* 4/2022 Sridharan et al. .... H04L 5/0053
(Continued)

FOREIGN PATENT DOCUMENTS

| KR | 101780886 B1 | 9/2017 |
| WO | 2017123139 A1 | 7/2017 |
| WO | 2019084711 A1 | 5/2019 |

OTHER PUBLICATIONS

International Search Report and Written Opinion issued Apr. 19, 2022 regarding Application No. PCT/KR2022/000705, 7 pages.
(Continued)

*Primary Examiner* — Yu-Wen Chang

(57) ABSTRACT

Methods and apparatuses for transmission of uplink channels. A method for a user equipment includes receiving: first information indicating a configuration for reception of first signals or channels, second information indicating counting to determine a number of repetitions, and third information indicating a first number of repetitions for a transmission of a second channel. The method further includes determining: an availability of a slot for transmission of a repetition of the second channel based on the first information, a value of a counter of repetitions based on the second information, and an indication for transmission of the repetition of the second channel in the slot based on: the availability, the value of the counter, and the first number of repetitions. The method further includes transmitting the repetition of the second channel in the slot based on the indication.

16 Claims, 12 Drawing Sheets

Related U.S. Application Data filed on Sep. 29, 2021, provisional application No. 63/227,176, filed on Jul. 29, 2021, provisional application No. 63/137,529, filed on Jan. 14, 2021.

(51) Int. Cl.
*H04W 72/23* (2023.01)
*H04W 72/0446* (2023.01)

(58) Field of Classification Search
CPC ......... H04L 1/18; H04L 1/1887; H04L 1/189; H04L 1/08
See application file for complete search history.

(56) References Cited

U.S. PATENT DOCUMENTS

| | | | | |
|---|---|---|---|---|
| 2022/0132533 | A1* | 4/2022 | Boroujeni et al. | H04L 5/0044 |
| 2022/0322396 | A1* | 10/2022 | Yu et al. | H04L 1/0025 |
| 2022/0345257 | A1* | 10/2022 | Moon et al. | H04L 1/189 |
| 2023/0071651 | A1* | 3/2023 | Hua et al. | H04W 72/23 |
| 2023/0217447 | A1* | 7/2023 | Guo | H04W 72/21 370/329 |
| 2023/0262720 | A1* | 8/2023 | Choi et al. | H04L 1/1864 |
| 2023/0396373 | A1* | 12/2023 | Gao et al. | H04L 1/189 |
| 2024/0137186 | A1* | 4/2024 | Takeda et al. | H04L 5/0035 |

OTHER PUBLICATIONS

Apple Inc., "Feature lead summary on PUSCH enhancements for NR eURLLC (AI 7.2.5.3)", 3GPP TSG-RAN WG1 Meeting #101-e, R1-2004224, 41 pages.

"3rd Generation Partnership Project; Technical Specification Group Radio Access Network; NR; Medium Access Control (MAC) protocol specification (Release 16)", 3GPP TS 38.321, V16.3.0, Dec. 2020, 156 pages.

Extended European Search Report issued Jan. 17, 2024 regarding Application No. 22739749.4, 8 pages.

Samsung, "PUSCH coverage enhancement", 3GPP TSG RAN WG1 #103-e, R1-2009647, Oct. 2020, 9 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

\* cited by examiner

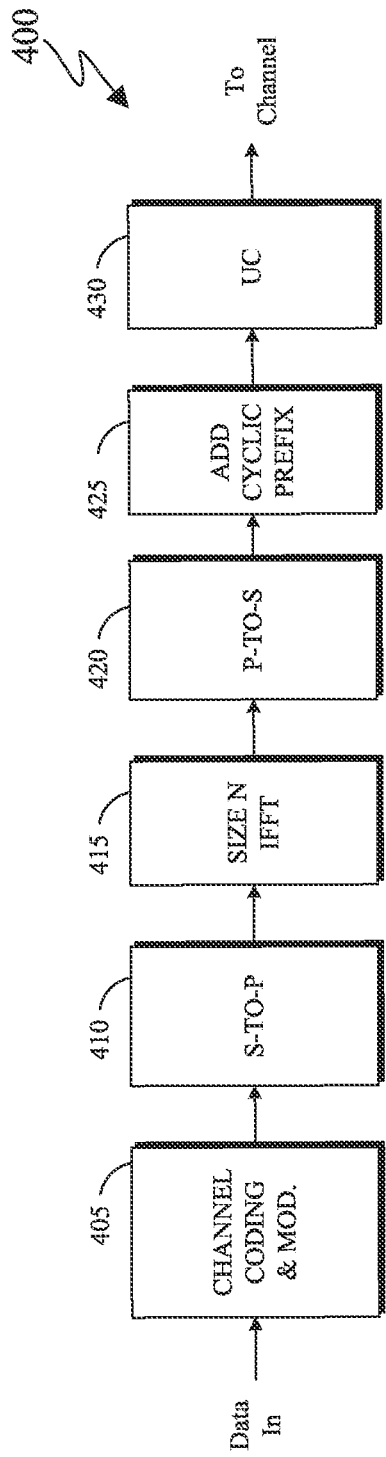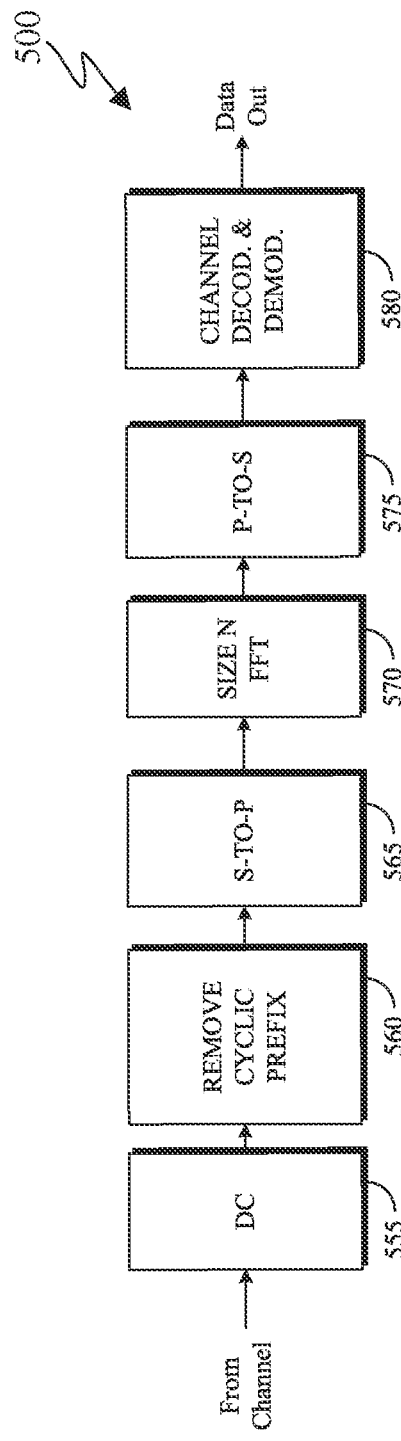

METHOD AND APPARATUS FOR TRANSMISSION OF UPLINK CHANNELS

CROSS-REFERENCE TO RELATED APPLICATION AND CLAIM OF PRIORITY

This application claims priority under 35 U.S.C. § 119(e) to U.S. Provisional Patent Application No. 63/137,529 filed on Jan. 14, 2021, U.S. Provisional Patent Application No. 63/227,176 filed on Jul. 29, 2021, U.S. Provisional Patent Application No. 63/250,021 filed on Sep. 29, 2021, and U.S. Provisional Patent Application No. 63/255,919 filed on Oct. 14, 2021. The above-identified provisional patent applications are hereby incorporated by reference in their entirety.

TECHNICAL FIELD

The present disclosure relates generally to wireless communication systems and, more specifically, the present disclosure relates to transmission of uplink channels.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to method and apparatus for transmission of uplink channels.

In one embodiment, a user equipment (UE) includes a transceiver and a processor operably connected to the transceiver. The transceiver is configured to receive: first information indicating a configuration for reception of first signals or channels, second information indicating counting a number of repetitions according to one of counting consecutive slots to determine the number of repetitions or counting transmitted repetitions to determine the number of repetitions, and third information indicating a first number of repetitions for a transmission of a second channel. The processor is configured to determine an availability of a slot for transmission of a repetition of the second channel based on the first information, a value of a counter of repetitions based on the second information, and an indication for transmission of the repetition of the second channel in the slot based on: the availability, the value of the counter, and the first number of repetitions. The transceiver is further configured to transmit the repetition of the second channel in the slot based on the indication.

In another embodiment, a base station (BS) is provided. The BS includes a transceiver and a processor operably connected to the transceiver. The transceiver is configured to transmit: first information indicating a configuration for transmission of first signals or channels, second information indicating counting a number of repetitions according to one of counting consecutive slots to determine the number of repetitions or counting transmitted repetitions to determine the number of repetitions, and third information indicating a first number of repetitions for a reception of a second channel. The processor is configured to determine: an availability of a slot for reception of a repetition of the second channel based on the first information, a value of a counter of repetitions based on the second information, and an indication for reception of the repetition of the second channel in the slot based on: the availability, the value of the counter, and the first number of repetitions. The transceiver is further configured to receive the repetition of the second channel in the slot based on the indication.

In yet another embodiment, a method is provided. The method includes receiving: first information indicating a configuration for reception of first signals or channels, second information indicating counting a number of repetitions according to one of counting consecutive slots to determine the number of repetitions or counting transmitted repetitions to determine the number of repetitions, and third information indicating a first number of repetitions for a transmission of a second channel. The method further includes determining: an availability of a slot for transmission of a repetition of the second channel based on the first information, a value of a counter of repetitions based on the second information, and an indication for transmission of the repetition of the second channel in the slot based on: the availability, the value of the counter, and the first number of repetitions. The method further includes transmitting the repetition of the second channel in the slot based on the indication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of present disclosure;

DETAILED DESCRIPTION

Figure 1:
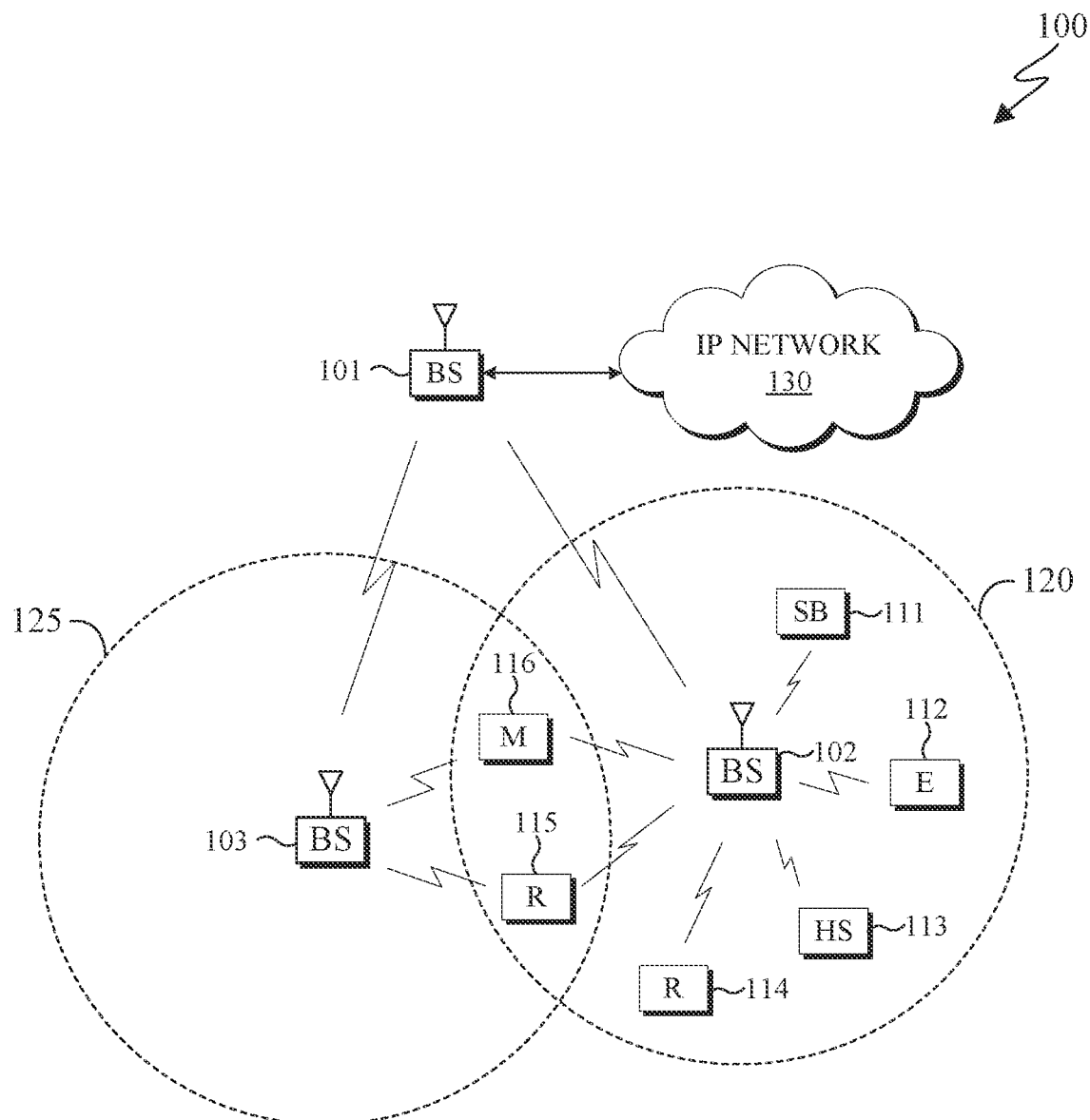
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: [1] 3GPP TS 38.211 v16.0.0, "NR; Physical channels and modulation;" [2] 3GPP TS 38.212 v16.0.0, "NR; Multiplexing and channel coding;" [3] 3GPP TS 38.213 v16.0.0, "NR; Physical layer procedures for control;" [4] 3GPP TS 38.214 v16.0.0, "NR; Physical layer procedures for data;" [5] 3GPP TS 38.321 v15.8.0, "NR; Medium Access Control (MAC) Protocol Specification;" and [6] 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
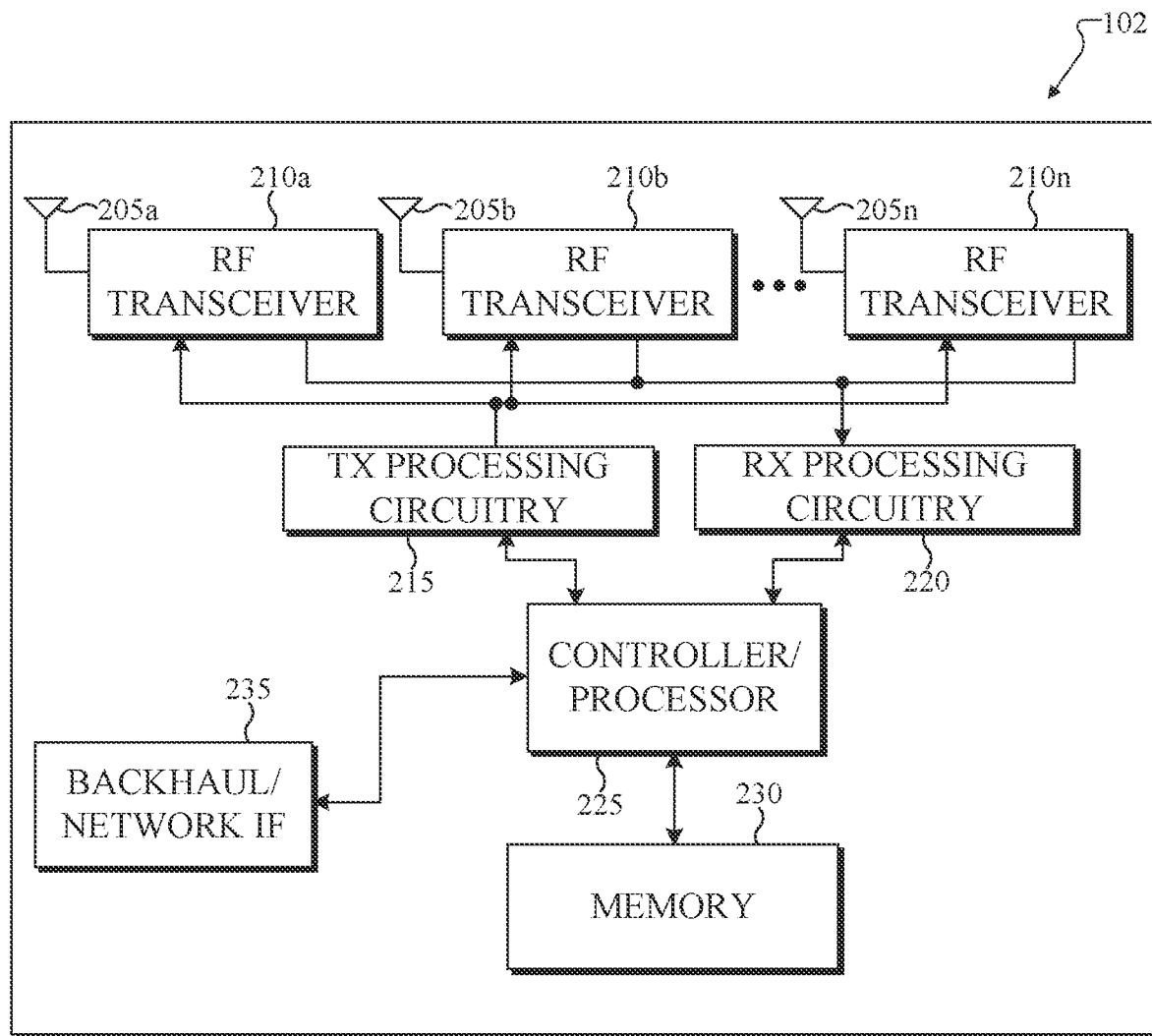
FIG. 2 illustrates an example base station (BS) according to embodiments of the present disclosure.
Figure 3:
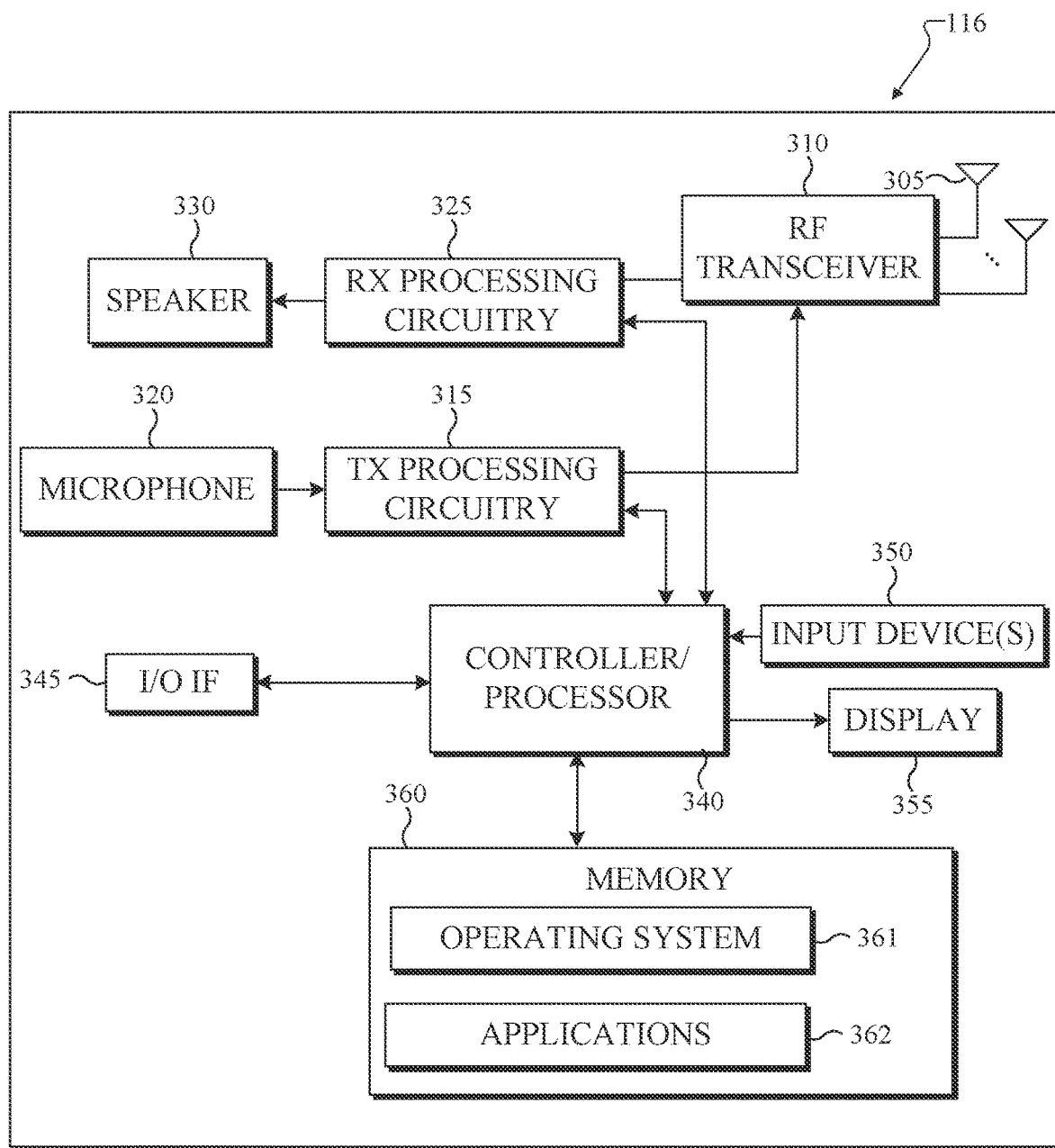
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA)

communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for transmission of uplink channels. In certain embodiments, and one or more of the BSs 101-103 includes circuitry, programming, or a combination thereof for transmission of uplink channels.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support transmission of uplink channels. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports transmission of uplink channels. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 215, and/or RX processing circuitry 220) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure as described in embodiments of the present disclosure. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support transmission of uplink channels as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to determining mechanisms or transmissions of uplink (UL) channels, such as a PUSCH physical uplink shared channel (PUSCH) or physical uplink control channel (PUCCH), with repetitions. The present disclosure also relates to a UE determining how to transmit an uplink channel from a number of repetitions and a number of slots. The present disclosure further relates to a UE determining how to transmit an uplink channel when a slot format is indicated by a slot format indicator (SFI) that is provided by a downlink control information (DCI) format. Additionally, the present disclosure relates to a UE determining how to transmit an uplink channel when a repetition is dropped or deferred based on an availability of some or all of the symbols in a slot. The present disclosure also relates to configuring a PUSCH or PUCCH transmission with repetitions.

A repetition of a PUSCH transmission can include symbols that are indicated as UL symbols by a UL-DL TDD configuration and/or by a configuration of a DL transmission provided by higher layer and can include only symbols indicated as UL symbols by a SFI provided by a DCI format. In the following, for brevity, reference is only to UL symbols.

In certain embodiments, PUSCH repetitions include a same TB in each repetition or some of the repetitions can include different TBs, or a same TB can be encoded and mapped to resource elements over multiple repetitions and additionally can be repeated for a number of times. For a PUCCH transmission with repetitions, a same control information can be provided in each repetition, or different control information can be provided in some repetitions, or same control information can be encoded and mapped to resource elements over multiple repetitions.

For applications that do not require small latency or large data rates, a typical approach to improve coverage is to increase a transmission time; that is, a physical signal or channel can be transmitted over a number of time units corresponding to a number of repetitions or retransmissions. For a UE with reduced capabilities, coverage enhancements may be required both for receptions, for example due to a reduced number of UE receiver antennas, and for transmissions, for example due to a lower maximum UE transmit power. For all types of UEs, when a UE is in extreme coverage limiting situation, such as when the UE experiences large path loss, relying on repetitions can improve coverage while maintaining an efficient network operation.

In certain embodiments, when a UE is scheduled to transmit a PUSCH that provides a transport block, a value m of a time domain resource assignment (TDRA) field in a DCI format scheduling the PUSCH transmission provides a row index m+1 to an allocated table. The DCI format is provided in a physical downlink control channel (PDCCH) reception. The indexed row defines a slot offset $K_2$ for the PUSCH transmission after a slot of the PDCCH reception, possibly after further adjusting by the sub-carrier spacing (SCS) configurations for the PDCCH and the PUSCH, the start and length indicator SLIV, or directly the start symbol S and the symbol allocation length L for the PUSCH transmission, the PUSCH mapping type, and the number of repetitions (if number of repetitions is present in the resource allocation table) for the PUSCH transmission.

There are two types of repetitions for a PUSCH transmission denoted as Type A and Type B. For PUSCH repetition Type A, the starting symbol S relative to the start of the slot, and the number of consecutive symbols L counting from the symbol S that is allocated for the PUSCH are determined from the start and length indicator value, SLIV, of the indexed row. When a UE transmits a PUSCH that is scheduled by a DCI format, the UE determines a number of repetitions K from the resource allocation table if higher layer parameter numberOfRepetitions is present; otherwise, from a value of higher layer parameter pusch-AggregationFactor. In the following, for brevity, an italicized parameter name refers to a higher layer parameter. The UE repeats the PUSCH transmission across the K consecutive slots by applying a same symbol allocation in each slot. The UE transmits a repetition of the PUSCH transmission in a slot only when L consecutive symbols in the slot, starting from symbol S, are not downlink (DL) symbols. For PUSCH repetition Type B, the starting symbol S relative to the start of the slot, and the number of consecutive symbols L counting from the symbol S allocated for the PUSCH, are provided by startSymbol and length of the indexed row of the resource allocation table, respectively. The number of nominal repetitions is given by numberOfRepetitions.

A UE can also repeat a transmission of a PUCCH in order to improve a reception reliability of uplink control information (UCI) provided by the PUCCH, wherein a repetition of the PUCCH transmission in each slot starts from a same symbol in the slot and is over a same number of consecutive symbols. When (i) there are not enough available symbols in a slot for a repetition of the PUCCH transmission, (ii) the repetition cannot start from a configured or indicated first symbol, or (iii) the repetition cannot occur in consecutive symbols of a slot, the UE does not transmit the PUCCH repetition in the slot. Rather the UE defers the repetition to a subsequent slots and does not count the slot in the number of configured or indicated slots for repetitions of a PUCCH transmission.

The following embodiments of the present disclosure, describe an indication of a number of repetitions when the expression numberOfRepetitions is present in the TDRA table.

In certain embodiments, a gNB configures various sets of number of repetitions in the TDRA table. For example, a first set of number of repetitions can include smaller values and a second set of number of repetitions can include larger values. More than two sets can also be configured. Table (1), below, describes an example TDRA table.

TABLE (1)

| Set | Number of repetitions |
|---|---|
| 1 | {n1, n2, n3, n4, n7, n8, n12, n16} |
| 2 | {n1, n2, n4, n8, n16, n32, n48, n64} |

Separate configurations can exist as illustrated in the examples denoted as syntax 1A, syntax 1B, syntax 1C, syntax 1D, and syntax 1E described below. PUSCH-Allocation-r16 and PUSCH-Allocation-r17 include different values for numbers of repetitions numberOfRepetitions-r16 and numberOfRepetitions-r17. For both sets of numbers of repetitions, a number of bits to indicate a value from the set of values in numberOfRepetitions-r16 or in numberOfRepetitions-r17 is equal to 3.

Alternatively, numberOfRepetitions-r17 has a smaller size and includes fewer values as in examples denoted as syntax 2A and syntax 2B, below for PUSCH-Allocation-r17. For example the number of bits to indicate a value from the set of values in numberOfRepetitions-r17 is equal to 2.

It is also possible that the size of numberOfRepetitions-r17 in PUSCH-Allocation-r17 respect to PUSCH-Allocation-r16 is larger and includes more values as in examples denoted as syntax 3A and syntax 3B, described below, for PUSCH-Allocation-r17. Here the number of bits to indicate a value from the set of values in numberOfRepetitions-r17 is equal to 4.

It is also possible that the set of values in numberOfRepetitions-r17 can be used only with a PUSCH repetition type, for example only when Type A or Type B is configured. In syntax 3A, the values of numberOfRepetitions-r17 can be used with any configured repetition type, while in syntax 3B numberOfRepetitions-r17 is conditional to a repetition type: numberOfRepetitions-r17 is used with PUSCH repetition Type A and can't be used with other repetition types, for example with Type B or Type A'. Repetition Type B or Type A' needs to use a different set of values for the number of repetitions wherein the set is configured in PUSCH-Allocation-r17 or PUSCH-Allocation-r16. Syntax 4C shows a configuration where numberOfRepetitions-r17 is only applicable to repetition Type A configured in PUSCH-Allocation-r16. Restrictions of applicability of a set of values or of a value of number of repetitions to a PUSCH repetition type can be configured for any size of the set of values and for any repetition type.

```
Syntax                                                      (1)
PUSCH-Allocation-r16 ::= SEQUENCE {
   mappingType-r16         ENUMERATED {typeA, typeB}
   OPTIONAL -- Cond NotFormat01-02-Or-TypeA
     startSymbolAndLength-r16  INTEGER (0..127)
   OPTIONAL -- Cond NotFormat01-02-Or-TypeA
     startSymbol-r16         INTEGER (0..13)
   OPTIONAL -- Cond RepTypeB
     length-r16              INTEGER (1..14)
   OPTIONAL, -- Cond RepTypeB
     numberOfRepetitions-r16   ENUMERATED {n1, n2, n3, n4, n7, n8,
   n12, n16}
   OPTIONAL, -- Cond Format01-02
   ...
}
Syntax                                                      (1A)
PUSCH-Allocation-r17 ::=  SEQUENCE {
   mappingType-r17         ENUMERATED {typeA, typeB}
   OPTIONAL, -- Cond NotFormat01-02-Or-TypeA
     startSymbolAndLength-r17  INTEGER (0..127)
   OPTIONAL, -- Cond NotFormat01-02-Or-TypeA
     startSymbol-r17         INTEGER (0..13)
   OPTIONAL, -- Cond RepTypeB
```

```
    length-r17              INTEGER (1..14)
OPTIONAL, -- Cond RepTypeB
    numberOfRepetitions-r17    ENUMERATED {n1, n2, n4, n8, n16,
n32, n48, n64}
OPTIONAL, -- Cond Format01-02
    ...
}
```

Syntax                                                      (1B)
```
PUSCH-Allocation-r17 ::= SEQUENCE {
    mappingType-r17         ENUMERATED {typeA, typeB}
OPTIONAL -- Cond NotFormat01-02-Or-TypeA
    startSymbolAndLength-r17  INTEGER (0..127)
OPTIONAL -- Cond NotFormat01-02-Or-TypeA
    startSymbol-r17         INTEGER (0..13)
OPTIONAL -- Cond RepTypeB
    length-r17              INTEGER (1..14)
OPTIONAL,      -- Cond RepTypeB
    numberOfRepetitions-r17    ENUMERATED {n4, n8, n12, n16, n20,
n24, n28, n32}
OPTIONAL, -- Cond Format01-02
    ...
}
```

Syntax                                                      (1C)
```
PUSCH-Allocation-r17 ::= SEQUENCE {
    mappingType-r17         ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n2, n4, n8, n16, n20,
n24, n28, n32}
OPTIONAL, -- Cond Format01-02
    ...
}
```

Syntax                                                      (1D)
```
PUSCH-Allocation-r17 ::= SEQUENCE {
    mappingType-r17         ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n1, n2, n4, n8, n16,
n24, n28, n32}
OPTIONAL, -- Cond Format01-02
    ...
}
```

Syntax                                                      (1E)
```
PUSCH-Allocation-r17 ::= SEQUENCE {
    mappingType-r17         ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n1, n4, n8, n16, n20,
n24, n28, n32}
OPTIONAL, -- Cond Format01-02
    ...
}
```

Syntax                                                      (2A)
```
PUSCH-Allocation-r17 ::= SEQUENCE {
    mappingType-r17         ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n16, n32, n48, n64}
OPTIONAL, -- Cond Format01-02
    ...
}
```

Syntax                                                      (2B)
```
PUSCH-Allocation-r17 ::= SEQUENCE {
    mappingType-r17         ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n20, n24, n28, n32}
OPTIONAL, -- Cond Format01-02
    ...
}
```

Syntax                                                      (3A)
```
PUSCH-Allocation-r17 ::= SEQUENCE {
    mappingType-r17         ENUMERATED {typeA, type B, typeA'}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n1, n2, n3, n4, n7, n8,
n12, n16, n20, n24, n28, n32}
OPTIONAL, -- Cond Format01-02
    ...
}
```

Syntax                                                      (3B)
```
PUSCH-Allocation-r17 ::= SEQUENCE {
    mappingType-r17         ENUMERATED {typeA, typeB, typeA'}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17         INTEGER (0..13)
OPTIONAL, -- Cond RepTypeB
    length-r17              INTEGER (1..14)
OPTIONAL, -- Cond RepTypeB
    numberOfRepetitions-r17    ENUMERATED {n1, n2, n3, n4, n7, n8,
n12, n16, n20, n24, n28, n32}
OPTIONAL, -- Cond Format01-02-Or-Type A
    ...
}
```

In certain embodiments, only field numberOfRepetitions-r16 is reconfigured to support different/larger values in the configurations provided by PUSCH-Allocation-r16. A size of the reconfigured field, numberOfRepetitions-r17, can be same as or different than a size of numberOfRepetitions-r16. The number of bits to indicate numberOfRepetitions-r17 can be same as for numberOfRepetitions-r16, such as 3. This is described in the examples, denoted as syntax 4A, syntax 4B, syntax 4C, and syntax 4D, described below.

Syntax                                                      (4A)
```
PUSCH-TimeDomainResourceAllocation-r16 ::= SEQUENCE {
    k2-r16                  INTEGER(0..32)   OPTIONAL, -- Need S
    puschAllocationList-r16    SEQUENCE (SIZE(1..maxNrofMultiplePUSCHs-
r16)) OF PUSCH-Allocation-r16,
```

-continued

```
    numberOfRepetitions-r17    ENUMERATED {n1, n2, n4, n8, n16, n32, n48,
n64}
OPTIONAL, -- Cond Format01-02
    ...
}
PUSCH-Allocation-r16 ::= SEQUENCE {
    mappingType-r16            ENUMERATED {typeA, typeB}
OPTIONAL, -- Cond NotFormat01-02-Or-TypeA
    startSymbolAndLength-r16   INTEGER (0..127)
OPTIONAL, -- Cond NotFormat01-02-Or-TypeA
    startSymbol-r16            INTEGER (0..13)
OPTIONAL, -- Cond RepTypeB
    length-r16                 INTEGER (1..14)
OPTIONAL, -- Cond RepTypeB
    numberOfRepetitions-r16    ENUMERATED {n1, n2, n3, n4, n7, n8,
n12, n16}
OPTIONAL, -- Cond Format01-02
    ...
}
Syntax                                              (4B)
PUSCH-TimeDomainResourceAllocation-r16 ::= SEQUENCE {
    k2-r16                 INTEGER(0..32)   OPTIONAL, -- Need S
    puschAllocationList-r16    SEQUENCE (SIZE(1..maxNrofMultiplePUSCHs-
r16)) OF
PUSCH-Allocation-r16,
    numberOfRepetitions-r17    ENUMERATED {n4, n8, n12, n16, n20, n24, n28,
n32}
OPTIONAL, -- Cond Format01-02
    ...
}
Syntax                                              (4C)
PUSCH-TimeDomainResourceAllocation-r16 ::= SEQUENCE {
    k2-r16                 INTEGER(0..32)   OPTIONAL, -- Need S
    puschAllocationList-r16    SEQUENCE (SIZE(1..maxNrofMultiplePUSCHs-
r16)) OF
PUSCH-Allocation-r16,
    numberOfRepetitions-r17    ENUMERATED {n1, n2, n4, n8, n16, n24, n28,
n32}
OPTIONAL, -- Cond Format01-02-Or-Type A
    ...
}
Syntax                                              (4D)
PUSCH-TimeDomainResourceAllocation-r16 ::= SEQUENCE {
    k2-r16                 INTEGER(0..32)   OPTIONAL, -- Need S
    puschAllocationList-r16    SEQUENCE (SIZE(1..maxNrofMultiplePUSCHs-
r16)) OF
PUSCH-Allocation-r16,
    numberOfRepetitions-r17    ENUMERATED {n1, n2, n3, n4, n7, n8, n12, n16,
n20, n24, n28, n32}
OPTIONAL -- Cond Format01-02-Or-Type A
    ...
}
```

In certain embodiments, the number of bits to indicate numberOfRepetitions-r17 can be different than the number of bits to indicate numberOfRepetitions-r16, for example 4 bits as in the example denoted as syntax 5, described below.

```
Syntax                                              (5)
PUSCH-TimeDomainResourceAllocation-r16 ::= SEQUENCE {
    k2-r16                 INTEGER(0..32)   OPTIONAL, -- Need S
    puschAllocationList-r16    SEQUENCE (SIZE(1..maxNrofMultiplePUSCHs-
r16)) OF
PUSCH-Allocation-r16,
    numberOfRepetitions-r17    ENUMERATED {n1, n2, n3, n4, n7, n8, n12, n16,
n20, n24, n28, n32}
OPTIONAL, -- Cond Format01-02
    ...
}
```

In certain embodiments, a field providing a factor value is configured. For example k-rep as illustrated below, in syntax (6), and a UE obtains a number of repetitions for a PUSCH or PUCCH transmission by multiplying a configured repetition number provided by numberOfRepetitions by the factor value in k-rep. For example, k-rep can have a value of 2 or 4, and the number of repetitions can be 2*{n1, n2, n3, n4, n7, n8, n12, n16} or 4*{n1, n2, n4, n8, n16, n32, n48, n64}, respectively. Alternatively, k-rep can be a 1-bit field or a 2-bit field in a DCI format scheduling the PUSCH or PUCCH transmission with repetitions. It is also possible that a set of values of k-rep is same as a set of values illustrated in various examples above for numberOfRepetitions-r17.

The following embodiments of the present disclosure describe an indication of a number of repetitions when the number of repetitions is not provided by the TDRA table.

For PUSCH repetition Type A, if number of repetitions is not present in the TDRA table and the UE (such as the UE 116) is provided pusch-AggregationFactor, a number of repetitions for a PUSCH transmission is equal to pusch-AggregationFactor which has values {n2, n4, n8}. For example, pusch-AggregationFactor can be {n2, n4, n8, n16} or {n2, n4, n8, n32} and the number of bits to indicate pusch-AggregationFactor can be 2. In another example pusch-AggregationFactor can be {n2, n4, n8, n16, n32, n48, n64} or {n2, n4, n8, n16, n20, n24, n28, n32} and the

```
Syntax                                              (6)
PUSCH-TimeDomainResourceAllocation-r16 ::= SEQUENCE {
    k2-r16   INTEGER(0..32)        OPTIONAL, -- Need S
    puschAllocationList-r16        SEQUENCE (SIZE(1..maxNrofMultiple
PUSCHs-r16)) OF
PUSCH-Allocation-r16,
    k-rep                 ENUMERATED {n2, n4} OPTIONAL, -- Cond
Format01-02
    ...
}
PUSCH-Allocation-r16 ::= SEQUENCE {
    mappingType-r16                ENUMERATED {typeA, typeB}
OPTIONAL, -- Cond NotFormat01-02-Or-TypeA
    startSymbolAndLength-r16       INTEGER (0..127)
OPTIONAL, -- Cond NotFormat01-02-Or-TypeA
    startSymbol-r16                INTEGER (0..13)
OPTIONAL, -- Cond RepTypeB
    length-r16                     INTEGER (1..14)
OPTIONAL, -- Cond RepTypeB
    numberOfRepetitions-r16        ENUMERATED {n1, n2, n3, n4, n7, n8,
n12, n16}
OPTIONAL, -- Cond Format01-02
    ...
}
```

It is also possible to extend numberOfRepetitions-16 to include more values. For example, numberOfRepetitions-16 can have 12 entries with {n1, n2, n3, n4, n7, n8, n12, n16, n24, n32, n48, n64} and the number of bits to indicate numberOfRepetitions-16 is 4. In another example the 12 entries are {n1, n2, n3, n4, n7, n8, n12, n16, n20, n24, n28, n32}. The number of rows in a TDRA table can be same as for numberOfRepetitions-16 with 8 values, thereby requiring a same number of bits in a DCI format for indicating a row of the TDRA table.

A UE (such as the UE 116) can be provided numberOfRepetitions-r17 as in sub-examples 4 for PUSCH transmission(s) that can be dynamically scheduled by an UL grant in a DCI, or the transmission can correspond to a configured grant Type 1 or Type 2. The configured grant Type 1 PUSCH transmission can be semi-statically configured to operate upon the reception of higher layer parameter of configuredGrantConfig including rrc-ConfiguredUplinkGrant without the detection of an UL grant in a DCI. The configured grant Type 2 PUSCH transmission can be semi-persistently scheduled by an UL grant in a valid activation DCI after the reception of higher layer parameter configuredGrantConfig not including rrc-ConfiguredUplinkGrant. For the PUSCH transmission corresponding to a Type 1 configured grant or a Type 2 configured grant activated by DCI format 0_1 or 0_2, when the UE is provided numberOfRepetitions-r17 in a TDRA table, the UE transmits PUSCH with a number of numberOfRepetitions-r17 repetitions. If the number of repetitions is not provided in the TDRA table, the UE can be provided another parameter by higher layers.

number of bits to indicate pusch-AggregationFactor is increased to 3. The extended range of values for pusch-AggregationFactor can apply to PUSCH repetition types other than Type A or be conditional to a PUSCH repetition type. In this example, the repetition type differs from repetition Type A in at least one of the following aspects for transmitting PUSCH repetitions: (i) number of repetitions within a slot; (ii) starting symbol of a repetition in a slot (parameter S); (iii) same symbol allocation in each slot; (iv) transmission of PUSCH symbols in consecutive symbols of a slot or across slot; (v) transmission of PUSCH repetitions in consecutive slots; (vi) transmission of PUSCH symbols in symbols available for UL transmission as configured by one or more higher layer parameters, for example tdd-UL-DL-ConfigurationCommon and/or tdd-UL-DL-Configuration-Dedicated and/or ssb-PositionsInBurst; and (vii) transmission of PUSCH symbols in symbols available for UL transmission by a dynamic indication, for example SFI and/or CI and/or DCI for higher priority channel.

For another example of when the number of repetitions is not present in the TDRA table is for PUSCH transmissions with configured grant. For a PUSCH transmissions with a Type 1 or Type 2 configured grant, wherein the number of (nominal) repetitions K to be applied to the transmitted transport block is provided by the indexed row in the TDRA table if numberOfRepetitions is present in the table; otherwise K is provided by the higher layer configured parameters repK. The parameter repK can be extended to include more values or another parameter repK-17 can be introduced, wherein repK-17 can include larger values and can have same or different size of repK. For example repK with the extended range of values can include (i) {n1, n2, n4, n8, n12, n16, n24, n32}; (ii) {n1, n2, n4, n8, n16, n20, n24, n32}; or (iii) {n1, n2, n4, n8, n16}. For example repK-17 can include (i) {n1, n2, n4, n16}; (ii) {n1, n4, n8, n16}; (iii) {n16, n24, n28, n32}; (iv) {n1, n2, n4, n8, n16}; (v) {n1, n2, n4, n8, n12, n16, n24, n32}; or (vi) {n1, n2, n4, n8, n16, n20, n24, n32}.

In certain embodiments, the parameter repK with the extended range of values or repK-17 can apply to one or more PUSCH repetition type or be conditional to a PUSCH repetition type, wherein repetition types can differ in at least one of the characteristics for transmitting PUSCH repetitions listed above in the description of pusch-AggregationFactor.

It is possible that parameters pusch-AggregationFactor-r17 and repK-17 are only applicable when a certain repetition type is configured. For example, if PUSCH repetition Type A is configured pusch-AggregationFactor-r17 and/or repK-17 can be applied, otherwise pusch-AggregationFactor and/or repK are applied. For another example, pusch-AggregationFactor-r17 and repK-17 can be configured with either PUSCH repetition Type A or PUSCH repetition Type B. For yet another example, pusch-AggregationFactor or pusch-AggregationFactor-r17 and/or repK or repK-17 and/or numberOfRepetitions-r16 or numberOfRepetitions-r17 can be applied depending on whether the number of repetitions is associated to a counting of physical slots, wherein physical slots are consecutive slots, or to a counting of slots that are available for UL transmission based on a configuration, for example an UL-DL-TDD configuration or a configuration of a DL transmission, or to a counting of slots that are available for the scheduled or semi-statically configured PUSCH transmission based on an FDD or SUL configuration.

It is also possible that applicability of pusch-AggregationFactor or pusch-AggregationFactor-r17, repK or repK-17, and numberOfRepetitions-r17 depends on whether the PUSCH transmission is dynamically scheduled by a DCI format or semi-statically configured, or on the DCI format that activates a semi-statically configured PUSCH transmission.

In one example, for the PUSCH transmission corresponding to a Type 1 configured grant activated by DCI format 0_0 the UE transmits with a number of repetitions provided by repK-17, and for the PUSCH transmission corresponding to a Type 1 configured grant activated by DCI format 0_1 or 0_2, the UE transmits with a number of repetitions provided by numberOfRepetitions-r17, if provided, otherwise with a number of repetitions provided by repK or repK-17.

For another example, for the PUSCH transmission corresponding to a Type 2 configured grant activated by DCI format 0_0 the UE transmits with a number of repetitions provided by repK-17, and for the PUSCH transmission corresponding to a Type 2 configured grant activated by DCI format 0_1 or 0_2, the UE transmits with a number of repetitions provided by numberOfRepetitions-r17, if provided, otherwise with a number of repetitions provided by repK or repK-17.

For yet another example, for the PUSCH transmission dynamically scheduled by DCI format 0_0, the UE transmits with a number of repetitions provided by pusch-AggregationFactor or pusch-AggregationFactor-r17, and for the PUSCH transmission dynamically scheduled by DCI format 0_1 or 0_2, the UE transmits with a number of repetitions provided by numberOfRepetitions-r17, if provided, otherwise with a number of repetitions provided by pusch-AggregationFactor or pusch-AggregationFactor-r17.

The following embodiments of the present disclosure, describe a determination of PUSCH repetitions from a number of slots.

A UE can determine a number of slots for transmission of PUSCH repetitions from a TDRA (time domain resource allocation) configuration. A TDRA table can provide the information of a number of slots in three ways. In a first way, the TDRA table includes a column with the information of number of slots, wherein the number of slots can indicate consecutive or non-consecutive slots over which the UE transmits PUSCH repetitions. In the second way, the TDRA table includes a column with the information of number of repetitions (nominal number of repetitions), wherein the nominal number of repetitions can be an indication of the number of consecutive or non-consecutive slots over which the UE transmits PUSCH repetitions. In the third way, the TDRA table includes the information of both number of repetitions and number of slots.

When the number of slots is consecutive, the number of repetitions is smaller than or equal to the number of slots as the UE may drop some repetitions in a slot where the UE cannot transmit the repetition based on the indicated S and L values. When the number of slots is non-consecutive, the number of repetitions is equal to the number of slots as the UE defers to a later slot a repetition that cannot be transmitted in a slot. Therefore, an indication for transmission of repetitions in consecutive or non-consecutive slots is equivalent to an indication for the UE to drop or postpone a repetition when the UE cannot transmit the repetition in the slot.

The number of slots, nrofslots, can be jointly coded with the fields S and L in the TDRA table. If both number of repetitions and number of slots are indicated in the TDRA table, these two fields can be jointly coded, and further be jointly coded with the fields S and L in the TDRA table.

In certain embodiments, the configuration of number of slots can be conditional to the configuration of Type A repetition or Type B repetition. For example, if the number of slots is only configured for Type B repetitions and is provided by nrofslots, such field is configured only if Type B repetition is configured as described in Syntax (7), below. Alternatively, if the number of slots is indicated by the number of repetitions in the TDRA configuration, is described in Syntax (8), below.

```
Syntax                                                    (7)
nrOfSlots-r17   ENUMERATED {n1, n2, n4, n8, n16, n32, n48, n64}
OPTIONAL, -- Cond RepTypeB
Syntax                                                    (8)
numberOfRepetitions-r17   ENUMERATED {n1, n2, n4, n8, n16, n32,
n48, n64} OPTIONAL, -- Cond RepTypeB
```

If the number of slots can be used with both Type A and Type B repetitions, it can be used as described in Syntax (9), below, conditional to the type of repetitions configured in PUSCH-TimeDomainResourceAllocationList-ForDCIformat0_1 and/or PUSCH-TimeDomainResourceAllocationList-ForDCIformat0_2, if configured

```
Syntax                                                    (9)
nrOfSlots-r17   ENUMERATED {n1, n2, n4, n8, n16, n32, n48, n64}
OPTIONAL, -- Cond Format01-02
```

Besides providing the information of nrofslots in the TDRA table, such parameter can be provided in the PUSCH-Config information element (IE) or can be indicated in a DCI format scheduling the PUSCH transmission. When a UE is configured with PUSCH Type A repetitions and the TDRA table is not configured or does not include the information of the number of slots (either by providing nrofslots or nrofrepetitions), the UE can be provided the number of slots in PUSCH-Config.

Regarding the second way in which the TDRA table can provide the information of a number of slots, the nominal number of repetitions in the TDRA table can be used by the UE as the number of slots over which the UE (such as the UE 116) can transmit PUSCH repetitions. The TDRA table includes a column that indicates the number of repetitions by providing nrofrepetitions, and another field indicates whether nrofrepetitions is used as number of slots. The UE can determine the actual number of repetitions by the number of slots. This applies to both Type A and Type B repetitions.

For PUSCH Type A repetitions, when a gNB (such as the BS 102) indicates a number of slots over which a UE can transmit PUSCH repetitions, the actual number of repetitions can be same as or smaller than the indicated number of slots.

For PUSCH Type B repetitions, when a gNB (such as the BS 102) indicates a number of slots over which a UE can transmit PUSCH repetitions, the actual number of repetitions can be same as or smaller/larger than the indicated number of slots.

When a gNB (such as the BS 102) provides a number of slots n over which a UE (such as the UE 116) can transmit PUSCH repetitions by means of: (i) indication of nrofslots in the TDRA table—as in a); (ii) indication of a number of nominal repetitions that is interpreted by the UE as number of slots—as in b); (iii) indication of nrofslots in PUSCH-Config; or (iv) indication of nrofslots in a DCI format scheduling the PUSCH transmission. The number of slots n can correspond to a number of consecutive slots. For example, for PUSCH Type A repetitions, the UE transmits a PUSCH repetition in a slot within the n consecutive slots when the slot includes enough consecutive or UL symbols to transmit one repetition; otherwise, the UE can drop the repetition. The UE transmits repetitions until the indicated number of consecutive slots is reached. If the UE can transmit PUSCH repetitions in all n consecutive slots, the actual number of repetitions is n. If the UE cannot transmit in all n consecutive slots, the actual number of repetitions is less than n. The indicated number of slots is a maximum number of slots (or a time interval) which for Type A repetitions is also the maximum number of repetitions, over which the UE can transmit PUSCH repetitions. For Type B repetitions, the UE transmits PUSCH repetitions in all available UL symbols, and since more than one repetition can be transmitted in a slot, the indicated number of slots is a maximum number of slots (or time interval) over which the UE can transmit an actual number of PUSCH repetitions which can be same/smaller/larger than the indicated number of slots.

Figure 6:
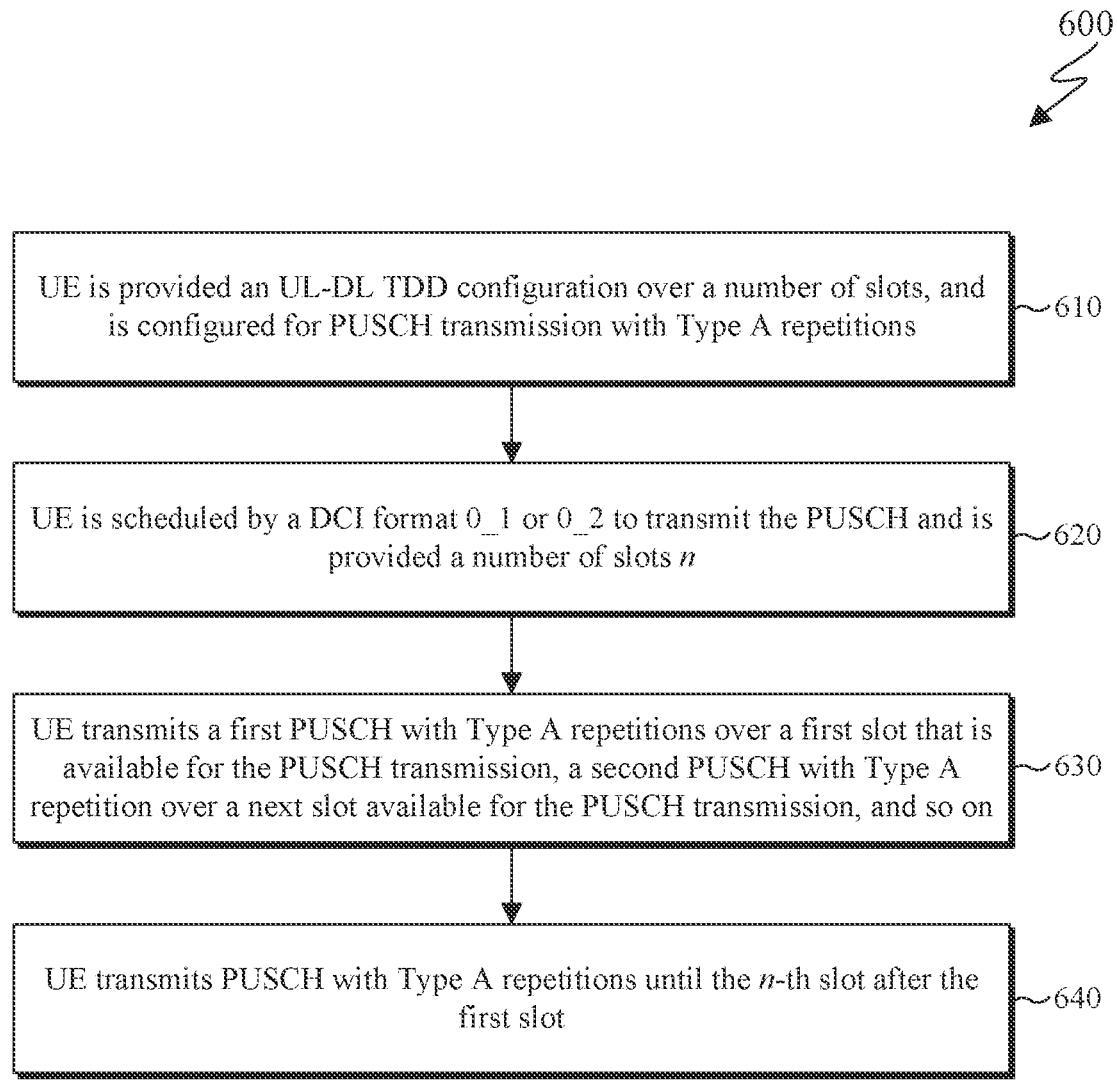
FIGS. 6-8 illustrates example methods for a UE to determine physical uplink shared channel (PUSCH) repetitions according to embodiments of present disclosure.
Figure 7:
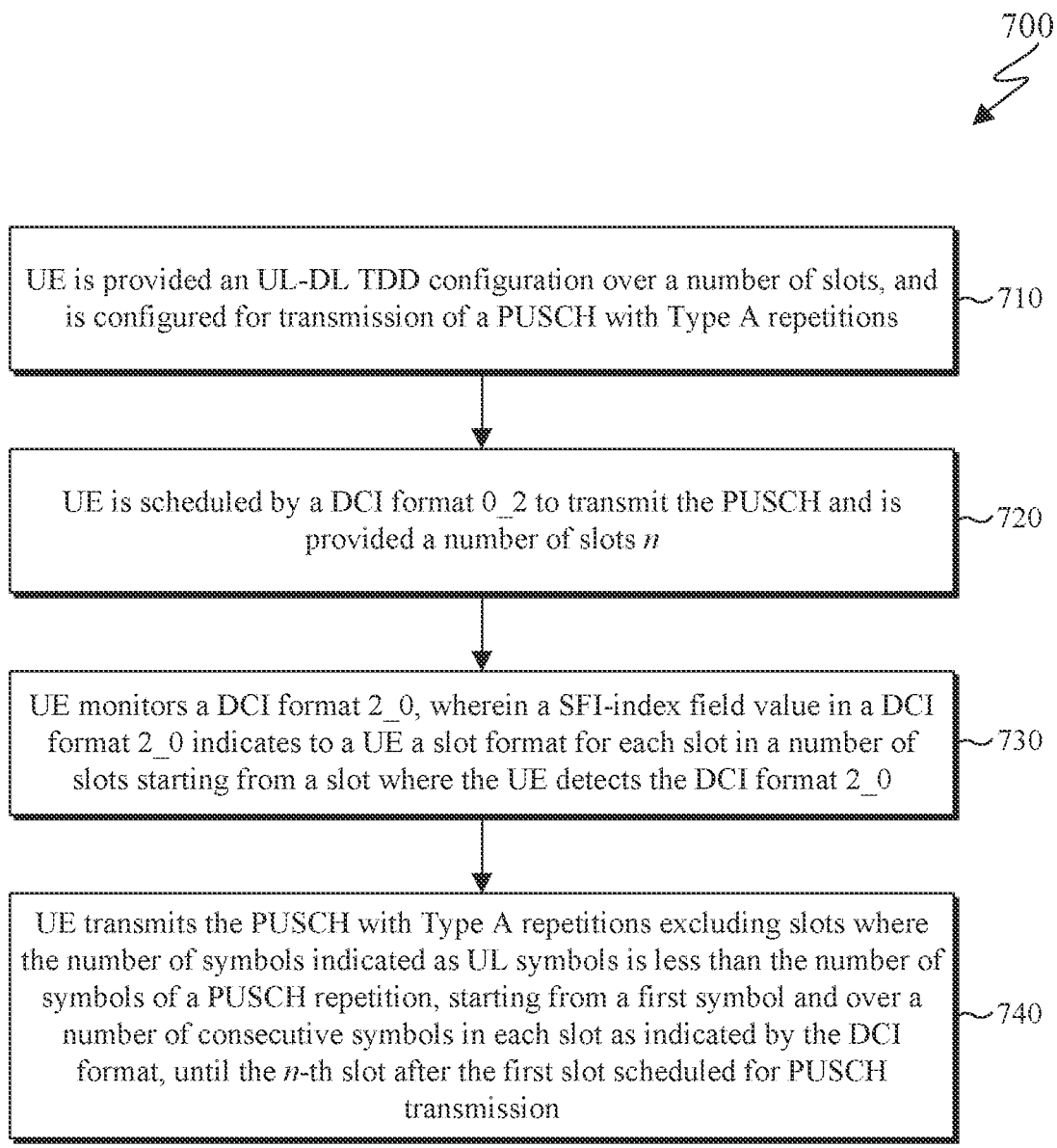
Figure 8:
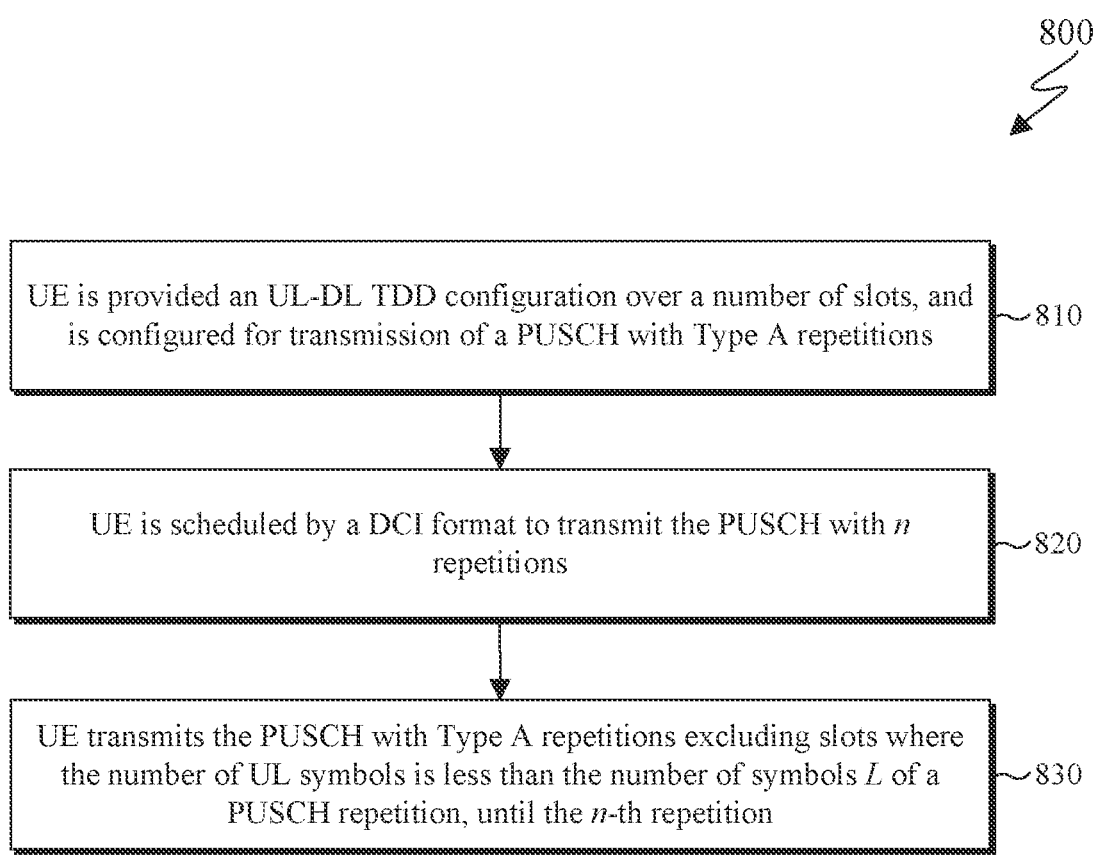

As described in greater detail below, an exemplary UE behaviour for the determination of PUSCH repetitions based on the information of a number of slots is illustrated in FIG. 6. FIG. 7 illustrates the UE behaviour for the determination of PUSCH repetitions when a SFI is provided in a PDCCH reception. FIG. 8 illustrates the UE behaviour for the determination of PUSCH repetitions when a Type A PUSCH repetition with fewer than L symbols can be transmitted.

When a gNB indicates a number of slots over which a UE can transmit PUSCH repetitions and the slots can be non-consecutive slots, if there are slots where the UE cannot transmit PUSCH repetition(s), the UE transmits in subsequent slots until the indicated number of slots is reached. Thus, when a UE cannot transmit in a slot, the PUSCH repetition is postponed/deferred.

The indication for a number of slots can by default be for a number of consecutive slot. To indicate that the slots can be non-consecutive slots, an additional field can be configured for whether or not the slots are consecutive, or that indication can be provided by the first entry of the field nrofslots: if c=0, the slots are non-consecutive; otherwise, the slots are consecutive, and the first entry indicates a number of slots. Alternatively, the first entry in nrofslots indicates whether the slots are consecutive or not: for example, c=0 for consecutive slots and c=1 for non-consecutive slots, as described in Syntax (10), below.

Syntax (10)
Nrofslots   ENUMERATED {c, n2, n3, n4, n7, n8, n12, n16}
OPTIONAL,

Regarding the third way in which the TDRA table can provide the information of a number of slots, when a gNB indicates both a number of slots and a number of repetitions, the UE transmits repetitions in the available slots until the indicated number of repetitions is reached (when the UE postpones to a next slot a repetition that the UE cannot transmit in a slot in case the slots can be non-consecutive) or until the indicated number of consecutive slots is reached (when the UE drops a repetition that the UE cannot transmit in a slot).

If both numberOfRepetitions and numberOfSlots are configured for a UE, the values and sizes of these parameters can be same or different, as illustrated in Syntax (11) below.

```
Syntax                                          (11)
PUSCH-Allocation-r17 ::= SEQUENCE {
    mappingType-r17           ENUMERATED {typeA, typeB}
OPTIONAL, -- Cond NotFormat01-02-Or-TypeA
    startSymbolAndLength-r17  INTEGER (0..127)
OPTIONAL, -- Cond NotFormat01-02-Or-TypeA
    startSymbol-r17           INTEGER (0..13)
OPTIONAL, -- Cond RepTypeB
    length-r17                INTEGER (1..14)
OPTIONAL, -- Cond RepTypeB
    numberOfRepetitions-r17   ENUMERATED {n1, n2, n3, n4, n7,
n8, n12, n16}
OPTIONAL, -- Cond Format01-02
    numberOfSlots-r17         ENUMERATED {n1, n2, n3, n4, n8,
n12,n16, n24}
OPTIONAL, -- Cond Format01-02
    ...
}
```

The following embodiments of the present disclosure describe a UE behavior for PUSCH transmission with repetitions. This is described in following examples and embodiments such as those of FIG. 6-9.

Figure 9:
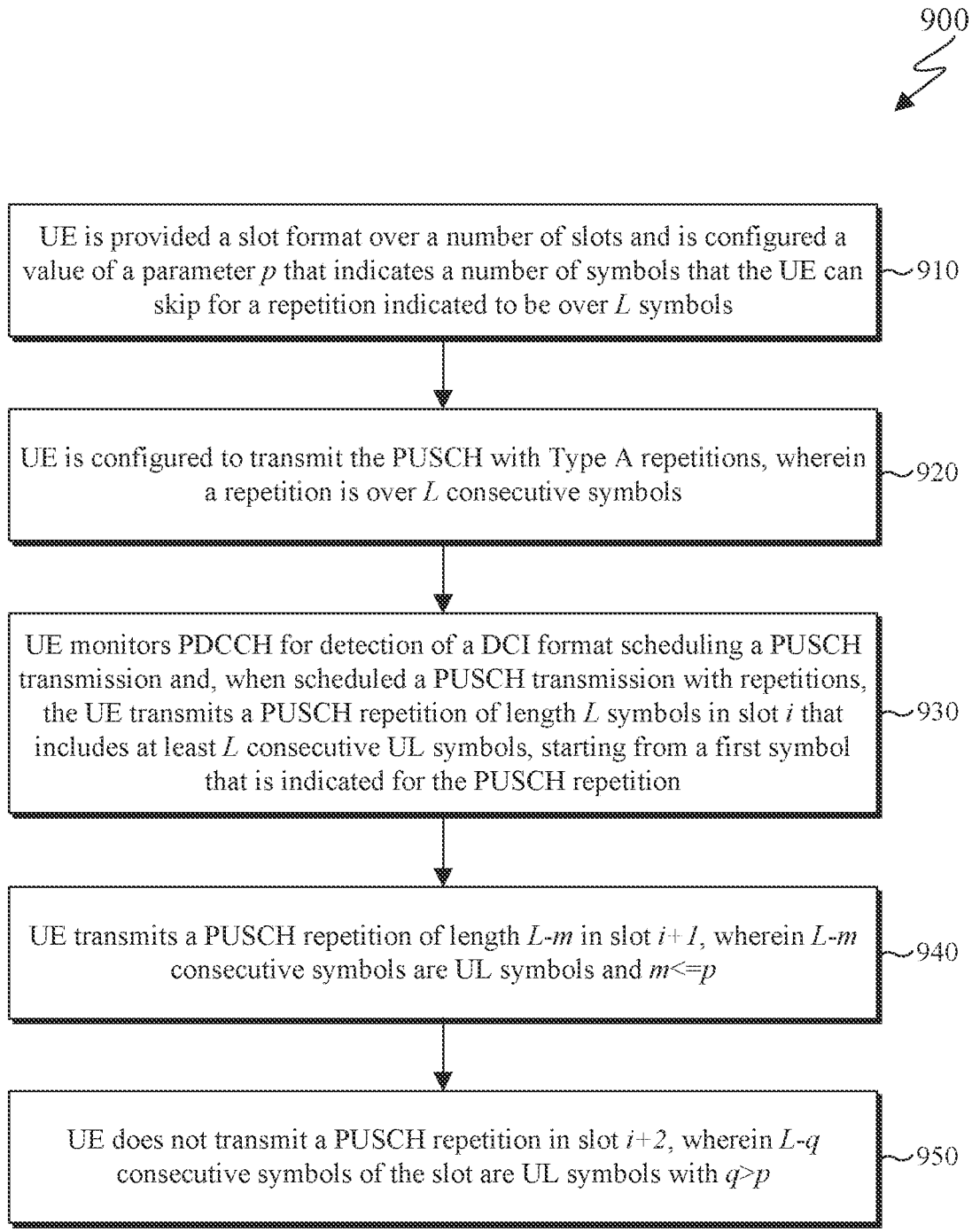
FIG. 9 illustrates an example method for a UE to determine whether to transmit a PUSCH repetition in a slot according to embodiments of present disclosure.

FIGS. 6-8 illustrates example methods 600, 700, and 800, respectively, for a UE to determine PUSCH repetitions according to embodiments of present disclosure. FIG. 9 illustrates an example method 900 for a UE to determine whether to transmit a PUSCH repetition in a slot according to embodiments of present disclosure. The steps of the methods 600 through 900 can be performed by any of the UEs 111-116 of FIG. 1, and include internal components similar to the UE 116 of FIG. 3. The methods 600 through 900 are for illustration only and other embodiments can be used without departing from the scope of the present disclosure.

FIG. 6 illustrates the method 600 for a UE to determine PUSCH repetitions when the UE is provided a number of slots n to transmit PUSCH repetitions. Here the value n is indicated by numberOfSlots, if present, or by numberOfRepetitions provided in a TDRA table, or in a DCI format, or indicated by higher layer parameter in a first example by pusch-AggregationFactor for Type A repetitions or in a second example by cg-nrofslots for CG-PUSCH Type 2.

In step 610, a UE (such as the UE 116) is provided an UL-DL TDD configuration over a number of slots, and is configured for PUSCH transmission with Type A repetitions. In step 620, the UE is scheduled by a DCI format 0_1 and 0_2 to transmit the PUSCH and is provided a number of slots n. In step 630, the UE transmits a first PUSCH with Type A repetitions over a first slot that is available for the PUSCH transmission, a second PUSCH with Type A repetition over a next slot available for the PUSCH transmission, and so on. In step 640, the UE transmits PUSCH with Type A repetitions until the n-th slot after the first slot.

The total number of PUSCH repetitions can be less than the value n when any of the n consecutive slots is not available for the PUSCH transmission. A slot can be unavailable for the PUSCH transmission when it does not include a number of consecutive UL symbols for a PUSCH transmission starting from a first symbol as indicated by the SLIV provided by the DCI format. The determination can be based on an UL-DL TDD configuration and/or by a configuration of a DL transmission provided by higher layers (and possibly adapted by an SFI-index when the PUSCH transmission is scheduled by a DCI format). An SFI-index field value in a DCI format 2_0 indicates to a UE a slot format for each slot in a number of slots $N_{SFI}$ starting from a slot where the UE detects the DCI format 2_0.

FIG. 7 illustrates the method 700 for a UE to determine PUSCH repetitions when the UE is provided with a number of slots n over which the UE can transmit PUSCH repetitions and an SFI-index field value in a DCI format 2_0 indicates a slot format.

In step 710, a UE (such as the UE 116) is provided an UL-DL TDD configuration over a number of slots, and is configured for transmission of a PUSCH with Type A repetitions. In step 720, the UE is scheduled by a DCI format to transmit the PUSCH and is provided a number of slots n. In step 730, the UE monitors a DCI format 2_0, wherein an SFI-index field value in a DCI format 2_0 indicates to a UE a slot format for each slot in a number of slots $N_{SFI}$ starting from a slot where the UE detects the DCI format 2_0. In step 740, the UE transmits the PUSCH with Type A repetitions excluding slots where the number of symbols indicated as UL symbols is less than the number of symbols of a PUSCH repetition, starting from a first symbol and over a number of consecutive symbols in each slot as indicated by the DCI format, until the n-th slot after the first slot scheduled for PUSCH transmission. Alternatively or additionally to step 740, the UE transmits the PUSCH with repetitions excluding slots where the number of symbols indicated as UL symbols is less than the number of symbols L of a PUSCH repetition, starting from a first symbol and over a number of consecutive symbols in each slot as indicated by the DCI format, until n repetitions are counted.

FIG. 8 illustrates the method 800 for a UE to determine PUSCH repetitions according to the disclosure.

In step 810, a UE (such as the UE 116) is provided an UL-DL TDD configuration over a number of slots, and is configured for transmission of a PUSCH with Type A repetitions. In step 820 the UE is scheduled by a DCI format to transmit the PUSCH with n repetitions. In step 830, the UE transmits the PUSCH with Type A repetitions excluding slots where the number of UL symbols is less than the number of symbols of a PUSCH repetition, until the n-th repetition. Alternative to step 820, the UE can be configured with Type 1 or Type 2 PUSCH transmission with n repetitions with a configured grant.

For PUSCH Type A repetitions, instead of not transmitting the PUSCH in a slot when the starting symbol S is not an uplink symbol or there are not at least L UL symbols in a slot, a UE can transmit the PUSCH starting from a symbol different than S if there are L UL symbols in a slot. A UE can also transmit if there are fewer UL symbols than L in a slot regardless of whether the transmission can start from symbol S or not. The PUSCH transmission in a slot starting from a symbol different than S and/or with fewer than L symbols can be possible regardless of whether the determination of an UL available symbols is by an UL-DL TDD configuration and/or by a configuration of a DL transmission provided by higher layers or is also adapted by an SFI-index when the PUSCH transmission is scheduled by a DCI format. Alternatively, the PUSCH transmission in a slot starting from a symbol different than S and/or with fewer than L symbols can happen only if SFI-index is used to determine the UL symbols. This can be applied either when the number of slots indicates consecutive slot (meaning that a transmission may be dropped) or non-consecutive (meaning that a transmission may be postponed/deferred).

It is also possible that the PUSCH transmission in a slot starting from a symbol different than S and/or with fewer than L symbols can use symbols when the determination of an UL available symbols is by an UL-DL TDD configuration and/or by a configuration of a DL transmission provided by higher layers and cannot use symbols when the determination of an UL available symbols is also adapted by an SFI-index when the PUSCH transmission is scheduled by a DCI format.

For PUSCH Type A repetitions, a UE (such as the UE 116) can transmit a PUSCH repetition in a slot over a smaller number of UL symbols than the symbols of a repetition. For example, if symbols 8 through 14 are indicated as UL symbols and a PUSCH repetition comprises 8 symbols, a UE can transmit 7 PUSCH symbols in that slot and not transmit the last symbol. A UE configured for PUSCH transmission with Type A repetitions can transmit a PUSCH repetition in a slot over at least m UL symbols, wherein the value m is optionally configured by a higher layer parameter or is indicated by a DCI format scheduling the PUSCH transmission, and the maximum number of symbols of a PUSCH repetition is larger than m. Alternatively the maximum number of symbols p where a UE does not transmit a PUSCH repetition can be optionally configured by a higher layer parameter or indicated by a DCI format scheduling the PUSCH transmission. For example, if more than p=2 symbols of a PUSCH repetition cannot be transmitted in a slot, the UE does not transmit the PUSCH repetition in the slot. The value p=0 is the default value and corresponds to a UE transmitting a PUSCH repetition in a slot only when the first symbol and the number of symbols for transmission of the PUSCH repetition in the slot are as configured by higher layers or as indicated by the DCI format scheduling the PUSCH transmission.

FIG. 9 illustrates the method 900 describing a procedure for a UE to determine whether to transmit a PUSCH repetition in a slot when the UE is provided a parameter p indicating a maximum number of symbols that the UE can skip for a repetition indicated to be over L symbols.

In step 910, a UE (such as the UE 116) is provided a slot format over a number of slots and is configured a value of a parameter p that indicates a number of symbols that the UE can skip for a repetition indicated to be over L symbols. In step 920, the UE is configured to transmit the PUSCH with Type A repetitions, wherein a repetition is over L consecutive symbols. In step 930, the UE monitors PDCCH for detection of a DCI format scheduling a PUSCH transmission and, when scheduled a PUSCH transmission with repetitions, the UE transmits a PUSCH repetition of length L symbols in slot i that includes at least L consecutive UL symbols, starting from a first symbol that is indicated for the PUSCH repetition. In step 940, UE transmits a PUSCH repetition of length L-m in slot i+1, wherein L-m consecutive symbols are UL symbols and m<=p. In step 950, the UE does not transmit a PUSCH repetition in slot i+2, wherein L-q consecutive symbols of the slot are UL symbols with q>p.

Although FIG. 6 illustrates the method 600, FIG. 7 illustrates the method 700, FIG. 8 illustrates the method 800, and FIG. 9 illustrates the method 900 various changes may be made to FIGS. 6-9. For example, while the method 600 of FIG. 6 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure, describe a determination of a number of slots.

For PUSCH repetition Type A, when a UE transmits a PUSCH scheduled by a DCI format with a value of a new data indicator (NDI) field NDI=1, the UE determines the number of slots n for repetitions of the PUSCH transmission, as described in Syntax (12), below Syntax                                                                 (12)
If the DCI format indicates numberOfSlots, or if numberOfSlots is present in the
resource
    allocation table, the number of slots n is equal to numberOfSlots;
elseif numberOfRepetitions is present in the resource allocation table, the number of slots
    n is equal to numberOfSlots;
elseif the UE is configured with pusch-AggregationFactor, the number of slots n is equal
    to pusch-AggregationFactor,
otherwise, n =1.

For PUSCH repetition Type B, when a UE transmits a PUSCH scheduled by a DCI format with NDI=1, the number of slots n is determined as described in Syntax (13), below.

Syntax                                                                 (13)
If numberOfSlots is indicated in the DCI format or is present in the resource allocation
    table, the number of slots n is equal to numberOfSlots;
else the number of slots n is equal to numberOfRepetitions.

The following embodiments of the present disclosure, describe an indication of number of additional slots.

A gNB (such as the BS 102) can indicate a number of slots that can be used in addition to a configured number of slots, if present, or in addition to a number of slots equal to the indicated or configured number of repetitions. For example, an indication or configuration of numberOfRepetitions=16 and of numberofslot-add=2 means that the UE (such as the UE 116) can transmit a maximum of 16 repetitions in a maximum time interval of 18 slots, wherein the field numberofslot-add can have two values, 1 slot or 2 slots. It is also possible that the indication of a number of additional slots is provided by a DCI format scheduling the PUSCH transmission. Then, when a UE drops Type A repetitions of a PUSCH transmission in respective slots, for example due to unavailability of a required number L of consecutive UL symbols or to unavailability of any symbol of a slot for UL transmission, the UE can use a maximum of 2 additional slots to compensate for dropped repetitions. The unavailability of some or all of the symbols of a lot for transmission of the scheduled/configured PUSCH repetition(s) can be determined by a slot format configuration, by configuration of transmission or reception of other higher priority transmissions or signals, or by overlapping with another UL transmission of higher priority, or also by cancellation of the PUSCH transmission in a slot. Such repetitions are effectively deferred repetitions for transmission in slots that are available for PUSCH transmission. When K indicates the number of repetitions, the slots where the deferred repetitions are transmitted are after at least K consecutive slot from the slot where the first PUSCH repetition is transmitted, and the overall duration of the transmission of K repetitions is larger than K slots. This mechanism provides flexibility to a network to control a total time that a UE transmits repetitions instead of always fixing that time based on the indicated number of repetitions by not postponing dropped repetitions and therefore having varying reception reliability, or instead of always postponing dropped repetitions and therefore having a varying total transmission time that can inhibit subsequent scheduling to the UE or to other UEs.

A gNB (such as the BS 102) can configure or indicate a number of additional slots N that a UE can use to transmit PUSCH repetitions with values ranging from zero to a large value such as infinity. When a value of zero is indicated or configured by a gNB for the number of additional slots, the UE always drops repetitions in slots within the K consecutive slots that are not available for uplink transmission. The overall duration of the PUSCH transmission with repetitions is limited to K slots and the number of actual repetitions can be less than K. Thus, when the UE is configured to transmit the PUSCH with repetitions in K consecutive slots, the repetitions shall be terminated after transmitting K repetitions or after K slots, whichever is reached first. When a large value such as infinity is indicated or configured by a gNB for the number of additional slots, the UE always transmits repetitions in slots beyond the K consecutive slots if any of the K consecutive slots is not available for a PUSCH transmission. The overall duration of the PUSCH transmission with repetitions can span more than K slots and the number of actual repetitions would be K. Thus, the repetitions shall be terminated after transmitting K repetitions. It is also possible that the duration of the overall transmission is configured to be M consecutive slots, with M>K, and the repetitions shall be terminated after transmitting K repetitions, or after M slots, whichever is reached first.

A gNB (such as the BS 102) can indicate a number of slots N that can be used in addition to a configured number of slots for transmission of PUCCH with repetitions. When a UE is configured with transmission of a PUSCH or PUCCH with K repetitions, the UE can be configured with transmission over K consecutive slots or can be configured with transmission over a number of consecutive slots wherein the number of consecutive slots can exceed K slots thereby allowing transmission of deferred repetitions.

For Type 1 or Type 2 PUSCH transmission with K repetitions with a configured grant, a UE is provided with a period P from which is derived a duration of the Type 1 or Type 2 PUSCH transmission with K repetitions. When the UE is configured to defer repetitions that cannot be transmitted in K consecutive slots to slots that are K slots or more than K slots apart from the slot where the first repetition is transmitted, the overall duration of the PUSCH transmission can span more than K slots and be within the time period P. For example, if the UE determines that, for a transmission occasion, the number of symbols available for the PUSCH transmission in a slot is smaller than transmission duration L of a repetition, the UE does not transmit the PUSCH in the transmission occasion. It is possible that the overall duration of the transmission exceeds the period P, for example the overall transmission can span a number of slots P+N, wherein P is the number of consecutive slots in the period P and N is the number of additional slots that the UE can use for the PUSCH transmission. Within P+N slots, the UE can transmit K repetitions or transmit fewer than K repetitions. It is also possible that the UE is configured to transmit over a number of slots until transmission of all K repetitions, wherein the number of slots comprises slots where a repetition is transmitted and slots where no repetition is transmitted and can be within or exceed a period P.

Accordingly, for Type 1 or Type 2 PUSCH transmission with K repetitions with a configured grant, when a UE can defer repetitions to available slots and the counting of the K repetitions is based on the available slots, the repetitions shall be terminated after transmitting K repetitions within the period P, or at the last transmission occasion among the K repetitions within the period P, or from the starting symbol of the repetition that overlaps with a PUSCH with the same hybrid automatic repeat request (HARQ) process scheduled by DCI format 0_0, 0_1 or 0_2, whichever is reached first. The UE is not expected to be configured with the time duration for the transmission of K repetitions larger than the time duration derived by the periodicity P.

Alternatively or additionally, the repetitions shall be terminated after transmitting K repetitions within P+N slots. The UE is not expected to be configured with the time duration for the transmission of K repetitions larger than the time duration derived by the periodicity P+N.

Alternatively or additionally, the repetitions shall be terminated after transmitting K repetitions. The UE can be configured with the time duration for the transmission of K repetitions larger than the time duration derived by the periodicity P.

The following embodiments of the present disclosure, describe a determination of PUCCH repetitions from a number of slots.

In certain embodiments, a UE (such as the UE 116) configures configured a number of slots, $N_{PUCCH}^{repeat}$, for repetitions of a PUCCH transmission by respective nrofSlots in a configuration of a PUCCH resource, or can be indicated $N_{PUCCH}^{repeat}$ by a DCI format (either using a value of an explicit/dedicated field or through a configured link to a value of another field in the DCI format). When $N_{PUCCH}^{repeat}>1$, the UE repeats the PUCCH transmission with the UCI over $N_{PUCCH}^{repeat}$ slots. The number of slots $N_{PUCCH}^{repeat}$ can indicate a number of consecutive slots. When a UE cannot transmit a PUCCH repetition in a slot, the UE can drop or postpone the repetition of the PUCCH transmission. Similar to PUSCH repetitions, a UE can be configured by higher layers or be indicated by a DCI format triggering the PUCCH transmission with repetitions, whether the UE shall defer or drop a repetition that the UE cannot transmit in a slot.

For example, a UE (such as the UE 116) can transmit a PUCCH repetition in a slot when the UE determines that the number of available symbols is equal to or larger than the value L provided by nrofSymbols for the corresponding PUCCH format, starting from symbol S. Otherwise, the UE drops the PUCCH repetition in the slot and counts the slot in the number of slots for repetitions of the PUCCH transmission or postpones the repetition to a subsequent slot. When the UE drops a repetition, the UE transmits repetitions until the indicated number of consecutive slots is reached. If the UE can transmit PUCCH repetitions in all $N_{PUCCH}^{repeat}$ consecutive slots, the actual number of repetitions is $N_{PUCCH}^{repeat}$. If the UE cannot transmit PUCCH repetition in all $N_{PUCCH}^{repeat}$ consecutive slots, the actual number of repetitions is less than $N_{PUCCH}^{repeat}$. The indicated number of slots is a maximum number of slots (or a time interval) which is also the maximum number of repetitions, over which the UE can transmit PUCCH repetitions.

Figure 10:
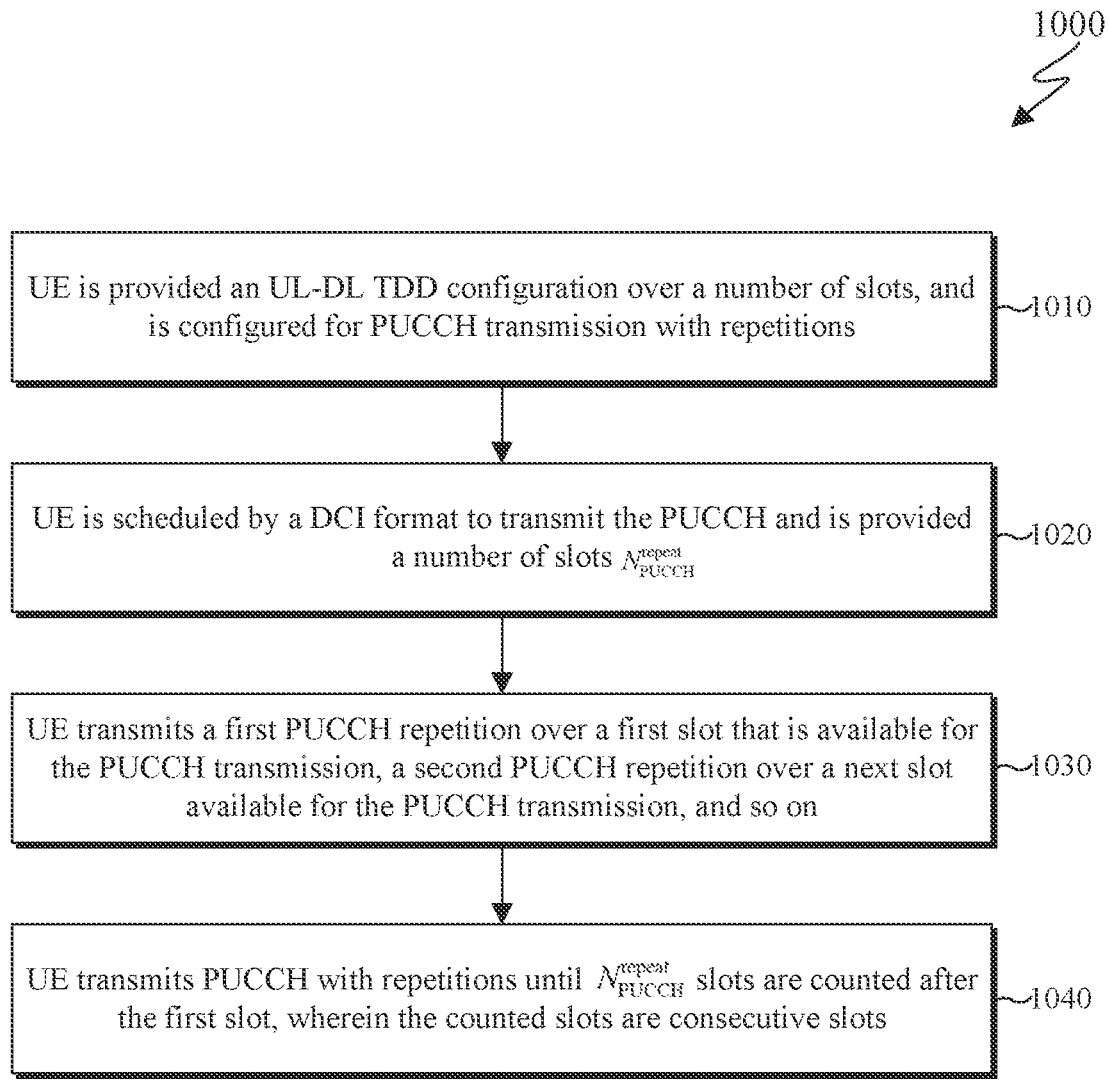
FIGS. 10-12 illustrates example methods for a UE to determine PUSCH repetitions according to embodiments of present disclosure.
Figure 11:
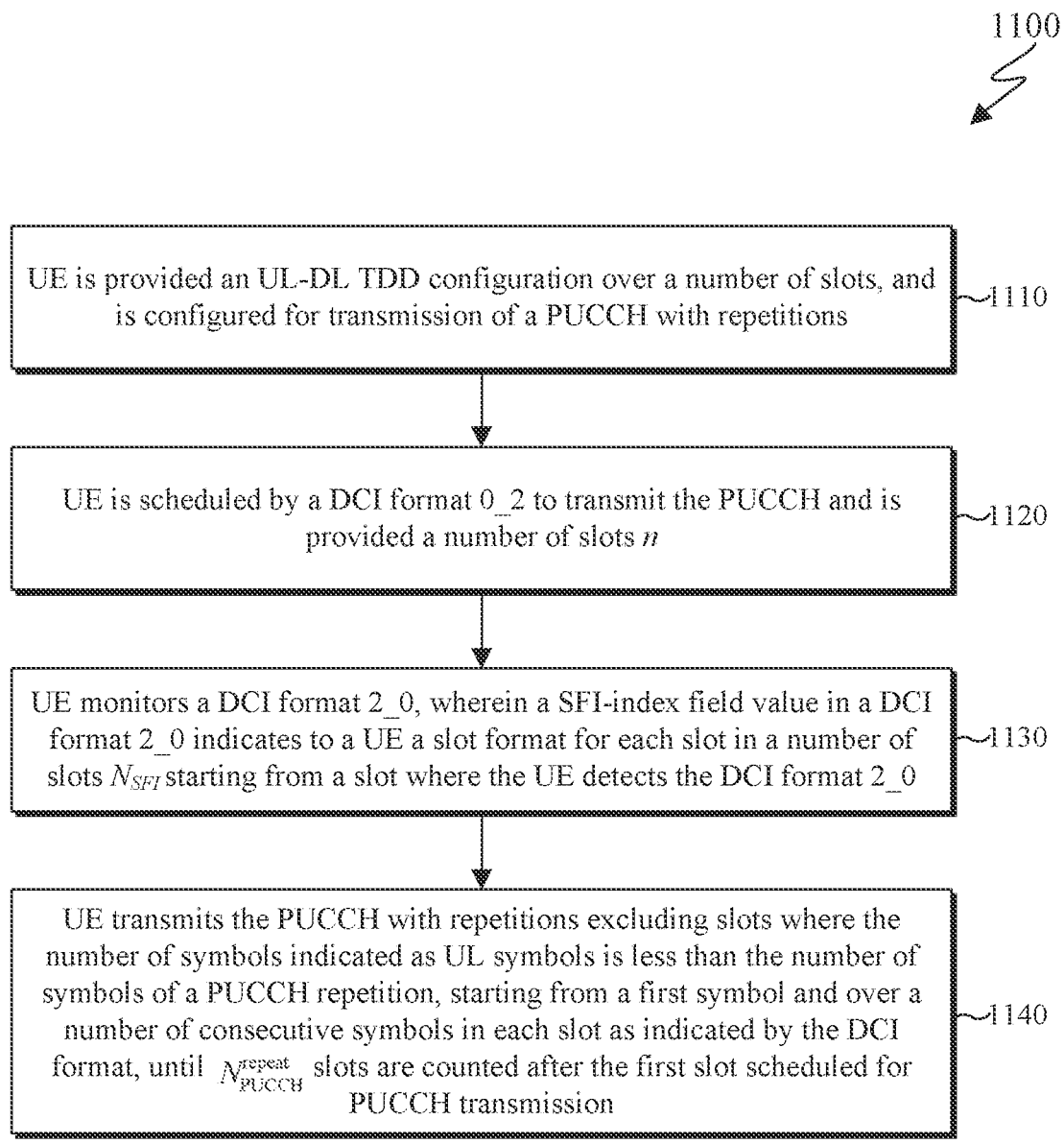

An exemplary UE behaviour for the determination of PUCCH repetitions is illustrated in FIG. 9. Another example in FIG. 10 illustrates the UE behaviour for the determination of PUCCH repetitions when a slot format indicator (SFI) is provided in a PDCCH transmission. Another example in FIG. 11 illustrates the UE behaviour for the determination of PUCCH repetitions when a PUCCH repetition with fewer than L symbols can be transmitted.

The number of slots $N_{PUCCH}^{repeat}$ can indicate a number of non-consecutive slots. If there are slots where the UE cannot transmit one or more PUCCH repetitions, the UE transmits in subsequent slots until the number of slots $N_{PUCCH}^{repeat}$ is reached. Thus, when a UE cannot transmit in a slot, the PUCCH repetition is postponed.

The indication for a number of slots can, by default, be for a number of non-consecutive slot, and the UE postpones a PUCCH transmission in a slot when the conditions for transmission are not satisfied. An additional field in a PUCCH format configuration can indicate whether or not the slots configured for repetitions of a PUCCH transmission are consecutive or not, or that indication can be provided by the first entry of the field nrofSlots: if c=0, the slots are non-consecutive; otherwise, the slots are consecutive, and the first entry indicates a number of slots. Alternatively, the first entry in nrofSlots indicates whether the slots are consecutive or not: for example, c=0 for consecutive slots and c=1 for non-consecutive slots. Syntax (14) below describes an example PUCCH format.

```
Syntax                                              (14)
nrofSlots-r17   ENUMERATED {c,n2,n4,n8}  OPTIONAL, -- Need S
```

It is also possible that a gNB configures nrofSlots and indicates that the slots configured for repetitions of a PUCCH transmission are non-consecutive or configures nrofSlots-r17 and indicates that the slots configured for repetitions of a PUCCH transmission are consecutive. It is also possible that a gNB configures nrofSlots and indicates that the slots configured for repetitions of a PUCCH transmission are consecutive or configures nrofSlots-r17 and indicates that the slots configured for repetitions of a PUCCH transmission are non-consecutive. It is also possible that the configuration of nrofSlots-r17 is associated to a functionality other than the transmission of PUCCH repetitions in either consecutive or non-consecutive slots. The two parameters nrofSlots and nrofSlots-r17 can be both configured and UE would use nrofSlots or nrofSlots-r17 depending on an additional configuration or indication. If none of the parameters is configured, UE would use a default value, wherein the default value can be 1. The length of the field nrofSlots-r17 can be same or different than the length of nrofSlots and each value of the parameter can indicate a same or different number of slots than the number of slots indicated by nrofSlots. It is also possible that the indication of number of non-consecutive slots includes more values than {n2, n4, n8} to allow a finer granularity in number of repetitions and a larger number of PUCCH repetitions. For example, a PUCCH resource can described in Syntax (14), below.

In step 1010, a UE (such as the UE 116) is provided an UL-DL TDD configuration over a number of slots, and is configured for PUCCH transmission with repetitions. In step 1020, the UE is scheduled by a DCI format to transmit the PUCCH and is provided a number of slots $N_{PUCCH}^{repeat}$. In step 1030, the UE transmits a first PUCCH repetition over a first slot that is available for the PUCCH transmission, a second PUCCH repetition over a next slot available for the PUCCH transmission, and so on. In step 1040, the UE transmits PUCCH with repetitions until $N_{PUCCH}^{repeat}$ slots are counted after the first slot, wherein the counted slots are consecutive slots.

It is noted that the total number of PUCCH repetitions can be less than the value $N_{PUCCH}^{repeat}$ when any of the $N_{PUCCH}^{repeat}$ consecutive slots is not available for the PUCCH transmission. A slot can be unavailable for the PUCCH transmission when it does not include a number of consecutive UL symbols for a PUCCH transmission starting from a first symbol as indicated by the startingSymbolIndex in the PUCCH format. The determination can be based on an UL-DL TDD configuration and/or by a configuration of a DL transmission provided by higher layers (and possibly adapted by an SFI-index when the PUCCH transmission is scheduled by a DCI format). An SFI-index field value in a DCI format 2_0 indicates to a UE a slot format for each slot in a number of slots $N_{SFI}$ starting from a slot where the UE detects the DCI format 2_0.

FIG. 11 illustrates the method 1100 for a UE to determine PUCCH repetitions when the UE is provided with a number of slots $N_{PUCCH}^{repeat}$ over which the UE can transmit PUCCH repetitions and an SFI-index field value in a DCI format 2_0 indicates a slot format.

In step 1110, a UE (such as the UE 116) is provided an UL-DL TDD configuration over a number of slots, and is configured for transmission of a PUCCH with repetitions. In

```
Syntax                                              (14)
PUCCH-FormatConfig ::= SEQUENCE {
    interslotFrequencyHopping   ENUMERATED {enabled} OPTIONAL, -- Need R
    additionalDMRS              ENUMERATED {true} OPTIONAL, -- Need R
    maxCodeRate                 PUCCH-MaxCodeRate OPTIONAL, -- Need R
    nrofSlots                   ENUMERATED {n2,n4,n8} OPTIONAL, --Need S
    nrofSlots-r17               ENUMERATED {n2,n3,n4,n6,n8,n12,n16}
OPTIONAL, -- Need S
    pi2BPSK                     ENUMERATED {enabled} OPTIONAL. -- Need R
    simultaneousHARQ-ACK-CSI    ENUMERATED {true} OPTIONAL -- Need R
}
```

The following embodiments of the present disclosure describe a UE behavior for PUCCH transmission with repetitions. This is described in following examples and embodiments such as those of FIG. 10-13.

Figure 12:
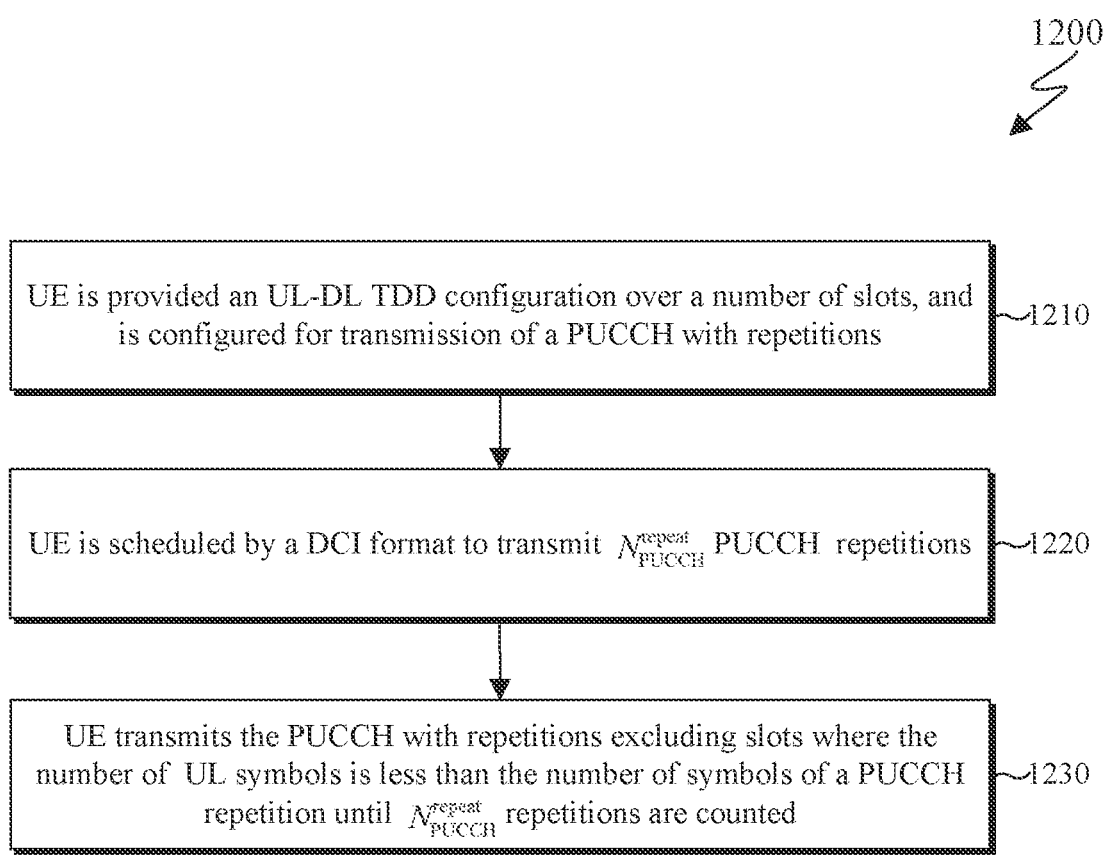
Figure 13:
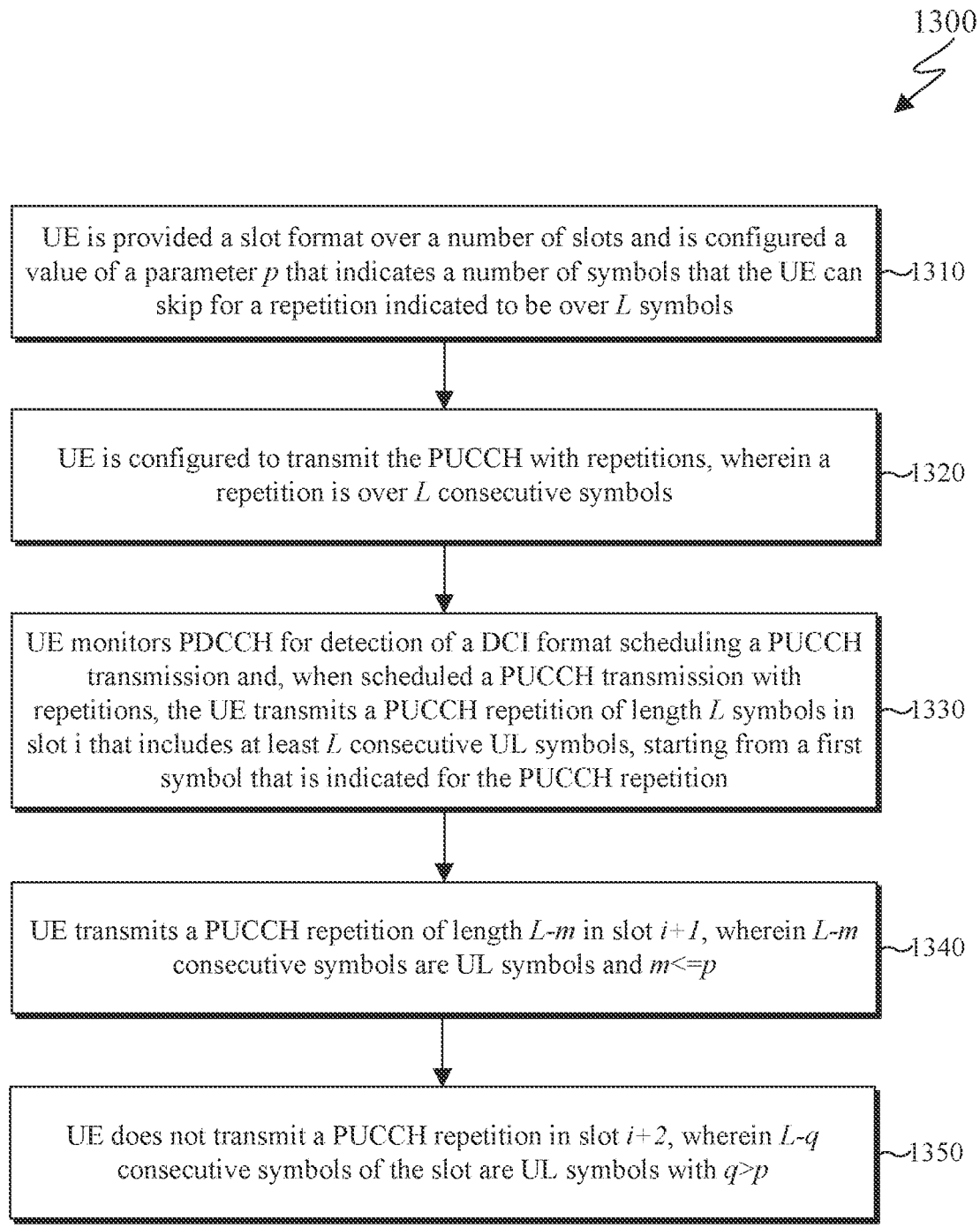
FIG. 13 illustrates an example method for a UE to determine whether to transmit a PUSCH repetition in a slot according to embodiments of present disclosure.

FIGS. 10-12 illustrates example methods 1000, 1100, and 1200 for a UE to determine PUSCH repetitions according to embodiments of present disclosure. FIG. 13 illustrates an example method 1300 for a UE to determine whether to transmit a PUSCH repetition in a slot according to embodiments of present disclosure. The steps of the methods 1000 through 1300 can be performed by any of the UEs 111-116 of FIG. 1, and include internal components similar to the UE 116 of FIG. 3. The methods 1000 through 1300 are for illustration only and other embodiments can be used without departing from the scope of the present disclosure.

FIG. 10 illustrates the method 1000 for a UE to determine PUCCH repetitions when the UE is configured a number of slots, $N_{PUCCH}^{repeat}$, for repetitions of a PUCCH transmission and the number of slots are consecutive slots.

step 1120, UE is scheduled by a DCI format to transmit the PUCCH and is provided a number of slots $N_{PUCCH}^{repeat}$. In step 1130, the UE monitors a DCI format 2_0, wherein an SFI-index field value in a DCI format 2_0 indicates to a UE a slot format for each slot in a number of slots $N_{SFI}$ starting from a slot where the UE detects the DCI format 2_0. In step 1140, the UE transmits the PUCCH with repetitions excluding slots where the number of symbols indicated as UL symbols is less than the number of symbols of a PUCCH repetition, starting from a first symbol and over a number of consecutive symbols in each slot as indicated by the DCI format, until $N_{PUCCH}^{repeat}$ slots are counted after the first slot scheduled for PUCCH transmission.

Alternatively, or additionally to step 1140, the UE transmits the PUCCH with repetitions excluding slots where the number of symbols indicated as UL symbols is less than the number of symbols of a PUCCH repetition, starting from a first symbol and over a number of consecutive symbols in each slot as indicated by the DCI format, until $N_{PUCCH}^{repeat}$ repetitions are counted after the first slot scheduled for PUCCH transmission.

FIG. 12 illustrates the method 1200 for a UE to determine PUCCH repetitions according to the disclosure.

In step 1210, a UE (such as the UE 116) is provided an UL-DL TDD configuration over a number of slots, and is configured for transmission of a PUCCH with repetitions. In step 1220, the UE is scheduled by a DCI format to transmit $N_{PUCCH}^{repeat}$ PUCCH repetitions. In step 1230, the UE transmits the PUCCH with repetitions excluding slots where the number of UL symbols is less than the number of symbols of a PUCCH repetition, until $N_{PUCCH}^{repeat}$ repetitions are counted. As an alternative to step 1220, the UE can be configured with semi-static PUCCH transmission with repetitions.

In certain embodiments, for PUCCH repetitions, instead of not transmitting the PUCCH in a slot when the starting symbol S is not an uplink symbol or there are not at least L UL symbols in a slot, a UE (such as the UE 116) transmits the PUCCH starting from a symbol different than S if there are L UL symbols in a slot. A UE (such as the UE 116) can also transmit if there are fewer UL symbols than L in a slot regardless of whether the transmission can start from symbol S or not. The PUCCH transmission in a slot starting from a symbol different than S and/or with fewer than L symbols can be possible regardless of whether the determination of an UL available symbols is by an UL-DL TDD configuration and/or by a configuration of a DL transmission provided by higher layers or is also adapted by an SFI-index when the PUCCH transmission is scheduled by a DCI format. Alternatively, the PUCCH transmission in a slot starting from a symbol different than S and/or with fewer than L symbols can happen only if SFI-index is used to determine the UL symbols. This can be applied either when the number of slots indicates consecutive slot (meaning that a transmission may be dropped) or non-consecutive (meaning that a transmission can be postponed/deferred).

It is also possible that the PUCCH transmission in a slot starting from a symbol different than S and/or with fewer than L symbols can use UL symbols when the determination of an UL available symbols is by an UL-DL TDD configuration and/or by a configuration of a DL transmission provided by higher layers and cannot use UL symbols when the determination of an UL available symbols is also adapted by an SFI-index when the PUSCH transmission is scheduled by a DCI format.

In certain embodiments, a UE (such as the UE 116) transmits a PUCCH repetition in a slot over a smaller number of UL symbols than the symbols of a repetition. For example, if symbols 8 through 14 are indicated as UL symbols and a PUCCH repetition comprises 8 symbols, a UE can transmit 7 PUCCH symbols in that slot and not transmit the last symbol. A UE configured for PUCCH transmission with repetitions can transmit a PUCCH repetition in a slot over at least m UL symbols, wherein the value m is optionally configured by a higher layer parameter or is indicated by a DCI format scheduling the PUCCH transmission, and the maximum number of symbols of a PUCCH repetition is larger than m. Alternatively the maximum number of symbols p where a UE does not transmit a PUCCH repetition can be optionally configured by a higher layer parameter or indicated by a DCI format scheduling the PUCCH transmission. For example, if more than p=2 symbols of a PUCCH repetition cannot be transmitted in a slot, the UE does not transmit the PUCCH repetition in the slot. The value p=0 is the default value and corresponds to a UE transmitting a PUCCH repetition in a slot only when the first symbol and the number of symbols for transmission of the PUCCH repetition in the slot are as configured by higher layers or as indicated by the DCI format scheduling the PUCCH transmission.

FIG. 13 illustrates the method 1300 for a UE to determine whether to transmit a PUCCH repetition in a slot when the UE is provided a parameter p indicating a maximum number of symbols that the UE can skip for a repetition indicated to be over L symbols.

In step 1310, a UE (such as the UE 116) is provided a slot format over a number of slots and is configured a value of a parameter p that indicates a number of symbols that the UE can skip for a repetition indicated to be over L symbols. In step 1320, the UE is configured to transmit the PUCCH with repetitions, wherein a repetition is over L consecutive symbols. In step 1330, the UE monitors PDCCH for detection of a DCI format scheduling a PUCCH transmission. When scheduled a PUCCH transmission with repetitions, the UE transmits a PUCCH repetition of length L symbols in slot i that includes at least L consecutive UL symbols, starting from a first symbol that is indicated for the PUCCH repetition. In step 1340, the UE transmits a PUCCH repetition of length L-m in slot i+1, wherein L-m consecutive symbols are UL symbols and m<=p. In step 1350, the UE does not transmit a PUCCH repetition in slot i+2, wherein L-q consecutive symbols of the slot are UL symbols with q>p.

Although FIG. 10 illustrates the method 1000, FIG. 11 illustrates the method 1100, FIG. 12 illustrates the method 1200, and FIG. 13 illustrates the method 1300 various changes may be made to FIGS. 10-13. For example, while the method 1000 of FIG. 10 is shown as a series of steps, various steps could overlap, occur in parallel, occur in a different order, or occur multiple times. In another example, steps may be omitted or replaced by other steps. For example, steps of the method 1000 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, from a base station, a first indication associated with available slots and a second indication associated with a number of slots and a number of repetitions; and
a processor operably coupled to the transceiver and configured to identify, based on the first indication, whether transmission of physical uplink shared channel (PUSCH) with repetitions is based on the available slots,
wherein the transceiver is further configured to:
in case that the transmission of the PUSCH with repetitions is based on the available slots, transmit, to the base station, the PUSCH with repetitions in the available slots until the number of slots, and
in case that the transmission of the PUSCH with repetitions is not based on the available slots, transmit, to the base station, the PUSCH with repetitions in consecutive slots until the number of slots.

2. The UE of claim 1, wherein the available slots are determined by an uplink-downlink (UL-DL) time division duplex (TDD) configuration provided by higher layers.

3. The UE of claim 1, wherein:
the second indication indicates another number of repetitions, and
a value of the number of repetitions is smaller than a value of the other number of repetitions.

4. The UE of claim 1, wherein:
the second indication indicates another number of repetitions, and
a set associated with a value of the number of repetitions or the other number of repetitions includes {n16, n24, n28}.

5. A base station (BS) comprising:
a processor; and
a transceiver operably coupled to the processor and configured to:
transmit, to a user equipment (UE), a first indication associated with available slots and a second indication associated with a number of slots and a number of repetitions,
in case that the first indication is configured that physical uplink shared channel (PUSCH) with repetitions are received based on the available slots, receive, from the UE, the PUSCH with repetitions in the available slots until the number of the slots, and
in case that the first indication is not configured that the PUSCH with repetitions are received based on the available slots, receive, from the UE, the PUSCH with repetitions in consecutive slots until the number of the slots.

6. The BS of claim 5, wherein the available slots are determined by an uplink-downlink (UL-DL) time division duplex (TDD) configuration provided by higher layers.

7. The BS of claim 5, wherein:
the second indication indicates another number of repetitions, and
a value of the number of repetitions is smaller than a value of the other number of repetitions.

8. The BS of claim 5, wherein:
the second indication indicates another number of repetitions, and
a set associated with a value of the number of repetitions or the other number of repetitions includes {n16, n24, n28}.

9. A method performed by a user equipment (UE), the method comprising:
receiving, from a base station, a first indication associated with available slots and a second indication associated with a number of slots and a number of repetitions;
identifying, based on the first indication, whether transmission of physical uplink shared channel (PUSCH) with repetitions is based on the available slots;
in case that the transmission of the PUSCH with repetitions is based on the available slots, transmitting, to the base station, the PUSCH with repetitions in the available slots until the number of slots; and
in case that the transmission of the PUSCH with repetitions is not based on the available slots, transmitting, to the base station, the PUSCH with repetitions in consecutive slots until the number of slots.

10. The method of claim 9, wherein the available slots are determined by an uplink-downlink (UL-DL) time division duplex (TDD) configuration provided by higher layers.

11. The method of claim 9, wherein:
the second indication indicates another number of repetitions, and
a value of the number of repetitions is smaller than a value of the other number of repetitions.

12. The method of claim 9, wherein:
the second indication indicates another number of repetitions, and
a set associated with a value of the number of repetitions the other number of repetitions includes {n16, n24, n28}.

13. A method performed by a base station (BS), the method comprising:
transmitting, to a user equipment (UE), a first indication associated with available slots and a second indication associated with a number of slots and a number of repetitions;
in case that the first indication is configured that physical uplink shared channel (PUSCH) with repetitions are received based on the available slots, receiving, from the UE, the PUSCH with repetitions in the available slots until the number of the slots; and
in case that the first indication is not configured that the PUSCH with repetitions are received based on the available slots, receive, from the UE, the PUSCH with repetitions in consecutive slots until the number of the slots.

14. The method of claim 13, wherein the available slots are determined by an uplink-downlink (UL-DL) time division duplex (TDD) configuration provided by higher layers.

15. The method of claim 13, wherein:
the second indication indicates another number of repetition, and
a value of the number of repetitions is smaller than a value of the other number of repetitions.

16. The method of claim 13, wherein:
the second indication indicates another number of repetitions, and
a set associated with a value of the number of repetitions or the other number of repetitions includes {n16, n24, n28}.

* * * * *